(12) United States Patent
Isobe et al.

(10) Patent No.: US 8,451,722 B2
(45) Date of Patent: May 28, 2013

(54) DATA TRANSFER APPARATUS

(75) Inventors: Takashi Isobe, Machida (JP); Takeki Yazaki, Hachioji (JP)

(73) Assignee: Alaxa Networks Corporation, Kanagawa (JP)

( * ) Notice: Subject to any disclaimer, the term of this patent is extended or adjusted under 35 U.S.C. 154(b) by 1232 days.

(21) Appl. No.: 11/212,678

(22) Filed: Aug. 29, 2005

(65) Prior Publication Data

US 2006/0176808 A1    Aug. 10, 2006

(30) Foreign Application Priority Data

Feb. 9, 2005    (JP) .................. 2005-032458

(51) Int. Cl.
*H04L 12/26*    (2006.01)

(52) U.S. Cl.
USPC ........................................... 370/230

(58) Field of Classification Search
None
See application file for complete search history.

(56) References Cited

U.S. PATENT DOCUMENTS

| | | | | |
|---|---|---|---|---|
| 5,568,468 A * | 10/1996 | Ogasawara et al. | ............ | 370/230 |
| 6,768,738 B1 * | 7/2004 | Yazaki et al. | ................. | 370/392 |
| 7,123,583 B2 * | 10/2006 | Hoar et al. | ..................... | 370/230 |
| 7,280,560 B2 * | 10/2007 | Bruckman et al. | ............ | 370/468 |
| 7,643,425 B2 * | 1/2010 | Yucel | .......................... | 370/238 |
| 2003/0043802 A1 * | 3/2003 | Yazaki et al. | ................. | 370/389 |
| 2004/0013089 A1 * | 1/2004 | Taneja et al. | .................. | 370/235 |
| 2004/0228274 A1 | 11/2004 | Yazaki et al. | | |

OTHER PUBLICATIONS

Ishikawa et al., "Proposal and Evaluation of the Group Policer with Bandwidth Guaranteeing and Sharing Function", The Institute of Electronics, Information and Communication Engineers, IEICE RCS 2004-20 CQ2004-20 (Apr. 2004), pp. 111-116.
The ATM Forum Technical Committee, "Traffic Management Specification", Version 4.0, (Apr. 1996), pp. 1-100.
Blake, S. et al., "An Architecture for Differentiated Services", Network Working Group, (Dec. 1998), pp. 1-37.

* cited by examiner

*Primary Examiner* — Chi Pham
*Assistant Examiner* — Mohammad Adhami
(74) *Attorney, Agent, or Firm* — Stites & Harbison PLLC; Juan Carlos A. Marquez, Esq.

(57) ABSTRACT

A data transfer apparatus is provided for monitoring the bandwidth of a first and a second flow, comprises flow detecting means for comparing information in a header field of a packet with the first and second detection conditions to detect a flow to which the packet belongs, compliance/violation determining means for measuring the bandwidth of the packet belonging to the detected flow to determine whether the packet complies with or violates a traffic condition which is set corresponding to each flow detection condition, and packet processing determining means for determining processing for a packet which satisfies both the first and second flow conditions based on the compliance/violation determination results corresponding to both traffic conditions, and determining processing for a packet which satisfies one of the first and second flow conditions based on the compliance/violation result corresponding to the flow detection condition satisfied by the packet.

10 Claims, 17 Drawing Sheets

FIG. 9

| TABLE ADDRESS | FLOW-SIP | FLOW-DIP | FLOW-SPORT | FLOW-DPORT | FLOW-DSCP | FLOW-SMAC | FLOW-DMAC | FLOW-UPRI | FLOW-PROTO | FLOW-PRI | FLOW-MAX | FLOW-MIN |
|---|---|---|---|---|---|---|---|---|---|---|---|---|
| 1 | 901-1 | 902-1 | 903-1 | 904-1 | 905-1 | 906-1 | 907-1 | 908-1 | 912-1 | 909-1 | 910-1 | 911-1 |
| 2 | 901-2 | 902-2 | 903-2 | 904-2 | 905-2 | 906-2 | 907-2 | 908-2 | 912-2 | 909-2 | 910-2 | 911-2 |
| ... | | | | | | | | | | | | |
| M | 901-M | 902-M | 903-M | 904-M | 905-M | 906-M | 907-M | 908-M | 912-M | 909-M | 910-M | 911-M |

(Rows: 900-1, 900-2, ..., 900-M; Table: 112)

FIG. 17

| FLOW NUMBER 1701 | FLOW DETECTION CONDITION 1702 | | PRIORITY TYPE 1703-1 1703-2 | | | TRAFFIC CONDITION 1704 | | PROCESSING DETERMINATION INFORMATION 1705 | | | | |
|---|---|---|---|---|---|---|---|---|---|---|---|---|
| flow No. | SOURCE IP | DESTINATION IP | PRI | MAX | MIN | BANDWIDTH | BURST | PRI-1-1 | PRI-1-2 | PRI-2-1 | PRI-2-2 |
| flow 1000 | jp192.168.200.0/24 | ip any | 1 | 1 | 0 | 100M | 300kByte | 0 | 2 | 0 | 0 |
| flow 1001 | ip any | jp192.168.201.0/24 | 2 | 0 | 1 | 50M | 300kByte | 0 | 0 | 0 | 2 |
| flow 1002 | ip any | jp192.168.202.0/24 | 2 | 0 | 1 | 50M | 300kByte | 0 | 0 | 0 | 2 |
| flow 1003 | ip192.168.200.0/25 | ip any | 2 | 0 | 1 | 70M | 300kByte | 0 | 0 | 0 | 4 |
| flow 1004 | ip192.168.200.128/25 | ip any | 2 | 0 | 1 | 30M | 300kByte | 0 | 0 | 0 | 4 |

DATA TRANSFER APPARATUS

INCORPORATION BY REFERENCE

The present application claims priority from Japanese application JP2005-032458 filed on Feb. 9, 2005, the content of which is hereby incorporated by reference into this application.

BACKGROUND OF THE INVENTION

The present invention relates to a data transfer apparatus which can monitor a bandwidth for each flow to determine appropriate processing for a received packet.

In IP (Internet Protocol) networks represented by the Internet, packets from a large number of users are communicated through the same line, so that the cost can be kept low per bandwidth. For this reason, enterprise users replace speech data networks (telephone networks) and key business networks with the IP networks with the intention of reducing the communication cost. From the background as mentioned above, an IP-VPN (Virtual Private Network) and a wide-band Ethernet (Ethernet is a registered trademark) service have been introduced for provision of the communication quality (QoS: Quality of Service) which had been provided by the speech data networks and key business networks based on dedicated lines.

In the IP-VPN and wide-band Ethernet services, a contract is made between an enterprise user and a carrier for a bandwidth for connecting hub sites such as the main office, branch offices and the like of the enterprise user to a network of the carrier (hereinafter called the "connection bandwidth"). In this event, the network of the carrier must be controlled such that a band through which each hub site transmits to the network of the carrier and a bandwidth through which each hub site receives from the network of the carrier do not exceed the connection bandwidth. For this reason, an edge node on the network of the carrier must be provided with a bandwidth monitoring function for limiting input/output packets to the connection bandwidth. The bandwidth monitoring function performs bandwidth monitoring which involves measuring the bandwidth of inputted or outputted packets, and determining as compliance when the measured bandwidth is within the connection bandwidth, and as violation when the measured bandwidth exceeds the connection bandwidth. This function monitors packets inputted from the respective hub sites and packets outputted to the respective hub sites for the bandwidth to limit bandwidth through which the respective hub sites make transmissions/receptions to the connection band.

In the bandwidth monitoring function, an algorithm for determining the compliance/violation is known, for example, from a leaky bucket algorithm described in Section 4.4.2 of The ATM Forum Approved Specifications Traffic Management 4.0. This algorithm is represented by a model of a leaky bucket which has a certain capacity and a hole. While the bucket contains water, water leaks in an amount proportional to the bandwidth under monitoring, and when a packet arrives at the bucket, an amount of water corresponding to the length of the packet is poured into the bucket. The bucket has the capacity for allowing fluctuations in arrival of packet and burst. An input packet is determined as compliance (within the bandwidth under monitoring) before the bucket overflows, and as violation (exceeding the bandwidth under monitoring) when the bucket overflows. FIG. 8 illustrates a flow cart of the leaky bucket algorithm. This algorithm employs variables: a packet arrival time LCT, and a counter value C corresponding to the amount stored in the bucket. As a packet k arrives at a time ta(k) (step 801), the algorithm calculates difference (corresponding to the amount of water leaking from the bucket) between the arrival time LCT of a packet which was updated when the packet was determined as compliance the last time and the arrival time ta(k). This value is subtracted from X to calculate X' (step 802), it is determined whether or not X' is negative (step 803), and X' is modified to 0' when X' is negative (step 804). Then, X' is compared with a limit L (corresponding to the capacity of the bucket) (step 805), and the input packet is determined as violation when $X' \geq L$, followed by termination of the processing without changing the values of X and LCT (step 806). When $X' \leq L$, the input packet is determined as compliance, and the sum of X' and a fixed value I determined by the bandwidth under monitoring (corresponding to the amount of water converted from one packet) is saved as X, and the arrival time of the cell is saved as LTC (step 807). When the first packet arrives, X is initialized to "0" while LCT to the arrival time of the first packet.

Also, Diffserv (Differentiated Service) (S. Blake, et al., "An Architecture for Differential Services," IETF, RFC 2475, December 1998) described in RFC2475 of IETF (Internet Engineering Task Force) is a technique for ensuring QoS such as a low delay time, a low discard ratio and the like for data transfers within a network. In a Diffserv-based network, an edge node classifies packets in accordance with source/destination IP addresses and source/destination port numbers within a packet header, a protocol, and the like, and rewrites a priority value of DSCP (Differentiated Service Code Point) within the packet header in accordance with the class. A node within the network performs a transfer operation associated with the priority value of DSCP. The edge node rewrites DSCP of a packet which requires a low delay time and a low discard ratio to a higher priority, and nodes within the network preferentially transfer packets with higher priorities to accomplish the low delay time and low discard ratio of packets.

Further, recently, there is another tendency of not only substituting IP-VAN and wide area Ethernet for networks built with dedicated lines, but also integrating general data networks for accessing web sites and communicating electronic mails and the like to further reduce the communication cost. In order to accomplish the integration while ensuring QoS, the bandwidth monitoring function must be provided with a bandwidth allocation function for ensuring a bandwidth for each of data type such that certain particular data fully occupies a connection bandwidth of each hub site.

JP-A-2000-349812 (U.S. Patent Publication No. 2004/0228274A1) describes a bandwidth allocation function for preferentially allocating a connection bandwidth to key business data. A bandwidth monitoring function which employs the preferential bandwidth allocation function gives a high priority to a key business data packet equal to or less than a bandwidth under monitoring, and gives the high priority to general data packets as well to an extent that the bandwidth under monitoring is not exceeded only when the key business data packets are less than the bandwidth under monitoring.

Another bandwidth allocation function is a group policer described in Yuichi Ishikawa et al., "Proposal and Evaluation of the Group Policer with Bandwidth Guaranteeing and Sharing Function," The Institute of Electronics, Information and Communication Engineers (IECE), RCS2004-20 CQ2004-20, April 2004. A bandwidth monitoring function which employs the group policer sets, in addition to a connection bandwidth, a guaranteed bandwidth for key business data and a guaranteed bandwidth for general data. A key business data packet and a general data packet which are determined to be equal to or less than the respective guaranteed bandwidths are given a high priority and a middle priority, respectively. Also, similar priorities are given when a total bandwidth of the key business data and general data are determined to be equal to or less than the connection bandwidth though they exceed their respective guaranteed bandwidths. When the total bandwidth of the key business data and general data is determined to exceed the connection bandwidth, associated packets are discarded. With the foregoing bandwidth monitoring operation, the bandwidth monitoring function which employs the group policer can allocate the connection bandwidth such that certain bandwidths can be ensured for respective data types such as general data, key business data and the like, while limiting a transmission/reception bandwidth of each hub site to the connection bandwidth or less.

Problems associated with the prior art will be described with reference to FIG. 2 which shows an example of wide area Ethernet service and IP-VPN service. Assume that a certain enterprise X has three hub sites X-0, X-1, X-2, and an intra-office networks 200, 201, 202 have been built in the respective hub sites. This enterprise X has built an integrated network for key business data and general data using a bandwidth monitoring function to which the group policer described in "Proposal and Evaluation of the Group Policer with Bandwidth Guaranteeing and Sharing Function" is applied. Here, the key business data refers to data which includes VoIP (Voice over Internet Protocol), video data, visual teleconference data, telephone conference data and the like.

The carrier has concluded a contract with the enterprise X that the carrier guarantees connection bandwidths of 100 Mbps, 60 Mbps, and 70 Mbps for the respective hub sites X-0, X-1, X-2 of the enterprise X for connection with a network 240 of the carrier, and guarantees bandwidths of 70 Mbps, 30 Mbps, and 40 Mbps for the key business data in the respective connection bandwidths, and guarantees the bandwidth of the remaining 30 Mbps for general data in the respective connection bandwidths.

Gateway nodes 210, 211, 212 are installed at inlet/outlet ports of the intra-office networks 200, 201, 202, respectively. These nodes are provided with the bandwidth monitoring function described in "Proposal and Evaluation of the Group Policer with Bandwidth Guaranteeing and Sharing Function" to limit packets transmitted by the respective hub sites X-0, X-1, X-2 to the aforementioned connection bandwidths or less. In addition, the connection bandwidths are allocated to satisfy the guaranteed bandwidths for the key business data and general data. A high priority key business packet and a middle priority general packet, which have been permitted to be communicated, are sent out to access lines 220, 221, 222. The network 240 of the carrier transfers the key business packet, which has been given the high priority, with a higher priority, and transfers the general packet, which has given the middle priority, with a lower priority. Upon receipt of packets which should be transferred to the access lines 220, 221, 222, the edge nodes 230, 231, 232 monitor the bandwidths in a manner as described in "Proposal and Evaluation of the Group Policer with Bandwidth Guaranteeing and Sharing Function" in a manner similar to the gateway nodes 210, 211, 212, to limit packets to the respective hub sites to their connection bandwidths or less and to allocate the bandwidths to ensure a certain bandwidth for each type of data.

Giving the bandwidth monitoring in the node 210 as an example, a description will be given of a problem associated with the baseband monitoring in accordance with the "Proposal and Evaluation of the Group Policer with Bandwidth Guaranteeing and Sharing Function" applied to the bandwidth monitoring. Assume that the bandwidth monitoring function of the node 210 involves setting three monitoring policies shown below, and conducing the bandwidth monitoring based on these monitoring policies. A first monitoring policy is Monitoring Policy A which limits packets transmitted by the hub site X-0 to the hub sites X-1, X-2 to the connection bandwidth 100 Mbps or less. Assume herein that a condition under which the hub site X-0 detects packets transmitted toward the hub sites X-1, X-2 is called the "flow detection condition A." A second and a third monitoring policy include Monitoring Policy B1 which monitors key business data packets transmitted by the hub site X-0 to the hub sites X-1, X-2 for a guaranteed bandwidth of 70 Mbps, and Monitoring Policy B2 which monitors general data packets transmitted by the hub site X-0 to the hub sites X-1, X-2 for a guaranteed bandwidth of 30 Mbps. FIG. 14 shows a Venn diagram which represents the relationship among the flow detection condition A, a flow detection condition B1 for detecting key business data packets transmitted by the hub site X-0 to the hub sites X-1, X-2, and a flow detection condition B2 for detecting general data packets transmitted by the hub site X-0 to the hub sites X-1, X-2. The flow detection condition A is in a relationship of encompassing the flow detection conditions B1, B2 (hereinafter this relationship is called the "unilateral comprehensive relationship").

Assume that while the bandwidth monitoring is under way at the node 210 in accordance with "Proposal and Evaluation of the Group Policer with Bandwidth Guaranteeing and Sharing Function," the hub site X-0 has transmitted key business data at 50 Mbps and 50 Mbps to the hub site X-1, X-2, respectively, and has transmitted general data at 100 Mbps to the hub site X-1. Since the hub site X-0 is guaranteed a bandwidth of 70 Mbps for key business data, the node 210 transmits a total of data at 65 Mbps which is a combination of key business data at 35 Mbps and general data at 30 Mbps, and transmits key business data at 35 Mbps to the hub site X-2. In other words, the data destined to the hub site X-2 is allocated a disadvantageous bandwidth over the data destined to the hub site X-1. Consequently, the enterprise X fails to accomplish an impartial bandwidth allocation between the hub sites X-1 and X2.

To prevent such a partial bandwidth allocation, the bandwidth monitoring function of the node 210 is required to perform the bandwidth monitoring by monitoring the packets transmitted by the hub site X-0 to the hub site X-1 based on Monitoring Policy C1 which monitors packets to check whether they exceed 50 Mbps, and monitoring the packets transmitted by the hub site X-0 to the hub site X-2 based on Monitoring Policy C2 which monitors packets to check whether they exceed 50 Mbps.

FIG. 15 shows a Venn diagram which represents the relationship among the flow detection conditions C1 and C2 for detecting packets transmitted by the hub site X-0 to the hub site X-1, X2 respectively, and the flow detection conditions A, B1, B2. The flow detection conditions B1, B2 and flow detection conditions C1, C2 are in a relationship that they share part of condition items (hereinafter, this relationship is called the "mutual comprehensive relationship"). While JP-A-2000-349812 (U.S. Patent Publication No. 2004/0228274A1), "The ATM Forum Approved Specifications Traffic Management 4.0," "An architecture for Differentiated Services," and "Proposal and Evaluation of the Group Policer with Bandwidth Guaranteeing and Sharing Function" include descriptions on the band monitoring for a flow which is detected from a plurality of flow detection conditions in the unilateral comprehensive relationship, they do not include descriptions on the bandwidth monitoring of a flow which is detected from a plurality of flow detection conditions in the mutual comprehensive relationship, so that a bandwidth monitoring apparatus which employs these prior art techniques have a problem of the inabilities to prevent such partial bandwidth allocation.

SUMMARY OF THE INVENTION

It is therefore an object of the present invention to provide a bandwidth monitoring function which is capable of supporting not only flow detection conditions in the unilateral comprehensive relationship but also those in the mutual comprehensive relationship when the bandwidth monitoring is performed based on a plurality of monitoring policies.

A data transfer apparatus according to the present invention includes the following means in order to solve the problems mentioned in "Background of the Invention".

Specifically, the data transfer apparatus includes flow detecting means for comparing information in a header of a packet received by a transmitter/receiver unit for transmitting and receiving packets with one or a plurality of flow detection conditions including at least one piece of information of the information in the packet header to determine a matching flow detection condition, compliance/violation determining means for measuring the bandwidth of an input packet which matches at least one of the one or plurality of flow detection conditions for each of the one or plurality of matching flow detection conditions to determine whether the packet complies with or violates traffic conditions respectively corresponding to the flow detection conditions, and packet processing determining means for determining appropriate processing for the packet based on the result of the determination on the compliance/violation of the one or plurality of matching traffic conditions.

The data transfer apparatus also includes packet processing determining means, operative when a first flow detection condition and a second detection condition, which share part of condition items, as the flow detection condition, for determining appropriate processing for a packet which matches both the first flow detection condition and second flow detection condition based on all the results of the compliance/violation determination of a traffic condition corresponding to the first flow detection condition and the compliance/violation determination of traffic conditions corresponding to the second flow condition, and for determining appropriate processing for a packet which matches only one of the first and second flow detection conditions based on the result of the compliance/violation determination of a traffic condition corresponding to the first or second flow detection condition which matches the packet.

The data transfer apparatus further comprises packet processing determining means for determining appropriate processing for a packet which matches the first or second flow detection condition, wherein the first and second flow detection conditions are encompassed by another third flow detection condition, based on all the results of the compliance/violation determination of traffic conditions corresponding to the third detection condition and compliance/violation determination of traffic conditions corresponding to the first or second flow condition, and for determining appropriate processing for a packet which does not match the first or second flow detection condition but matches the third flow detection condition based only on the result of the compliance/violation determination of a traffic condition corresponding to the third flow detection condition.

Problems to be solved by the present invention and solutions therefor other than the foregoing will be made apparent from the following "Description of the Embodiment" and the drawings of the present application.

A bandwidth monitoring apparatus which embodies the present invention can perform the bandwidth monitoring based on a plurality of monitoring policies not only when a plurality of flow detection conditions are in a unilaterally comprehensive relationship but also in a mutually comprehensive relationship.

In the prior art, the node 210 in FIG. 2 performs the bandwidth monitoring in order to ensure 100 Mbps as a connection bandwidth for the hub site X-0 and guarantee 70 Mbps and 30 Mbps for key business data and general data, respectively, whereas the present invention can further accomplish the bandwidth monitoring to monitor the bandwidths of traffic from the hub site X-0 to the hub sites X-1, X-2, respectively, to see whether the traffic exceeds 50 Mbps.

FIGS. 3 and 4 shows the result of a bandwidth allocation when a bandwidth of 50 Mbps is allocated to key business data communications for transmission from the hub site X-0 to the hub site X-2, a bandwidth of 200 Mbps is allocated to general data communications for transmission to the hub site X-1, and the bandwidth for the key business data communications is increased from 0 Mbps to 100 Mbps in increments of 10 Mbps. FIG. 3 shows the result of the bandwidth allocation according to the prior art, while FIG. 4 shows the result of the bandwidth allocation according to the present invention. In FIGS. 3, 4, the vertical axis represents the bandwidth for the key business data communications toward the hub site X-1, and the horizontal axis represents the allocated bandwidths. A black bar represents the bandwidth of key business data destined to the hub site X-1, a white bar represents the bandwidth for general data destined to the hub site X-1, and a gray bar represents the bandwidth for key business data destined to the hub site X-2.

In the prior art, if the bandwidth for the key business data communication toward the hub site X-1 increases beyond 30 Mbps, a bandwidth exceeding 50 Mbps (range surrounded by a dotted line) will be allocated to packets destined to the hub site X-1. On the other hand, the bandwidth monitoring apparatus which embodies the present invention can limit packets to X-1 to 50 Mbps or less at the gateway node 210, so that the bandwidth excessively allocated to the hub site X-1 (a range surrounded by a dotted line in FIG. 3) in the prior art can be used by the key business data destined to X-2.

Other objects, features and advantages of the invention will become apparent from the following description of the embodiments of the invention taken in conjunction with the accompanying drawings.

BRIEF DESCRIPTION OF THE DRAWINGS

FIG. 9 is a diagram showing a format for a flow detection condition table 112;

FIG. 17 shows an exemplary command.

DETAILED DESCRIPTION OF THE EMBODIMENTS

Figure 2:
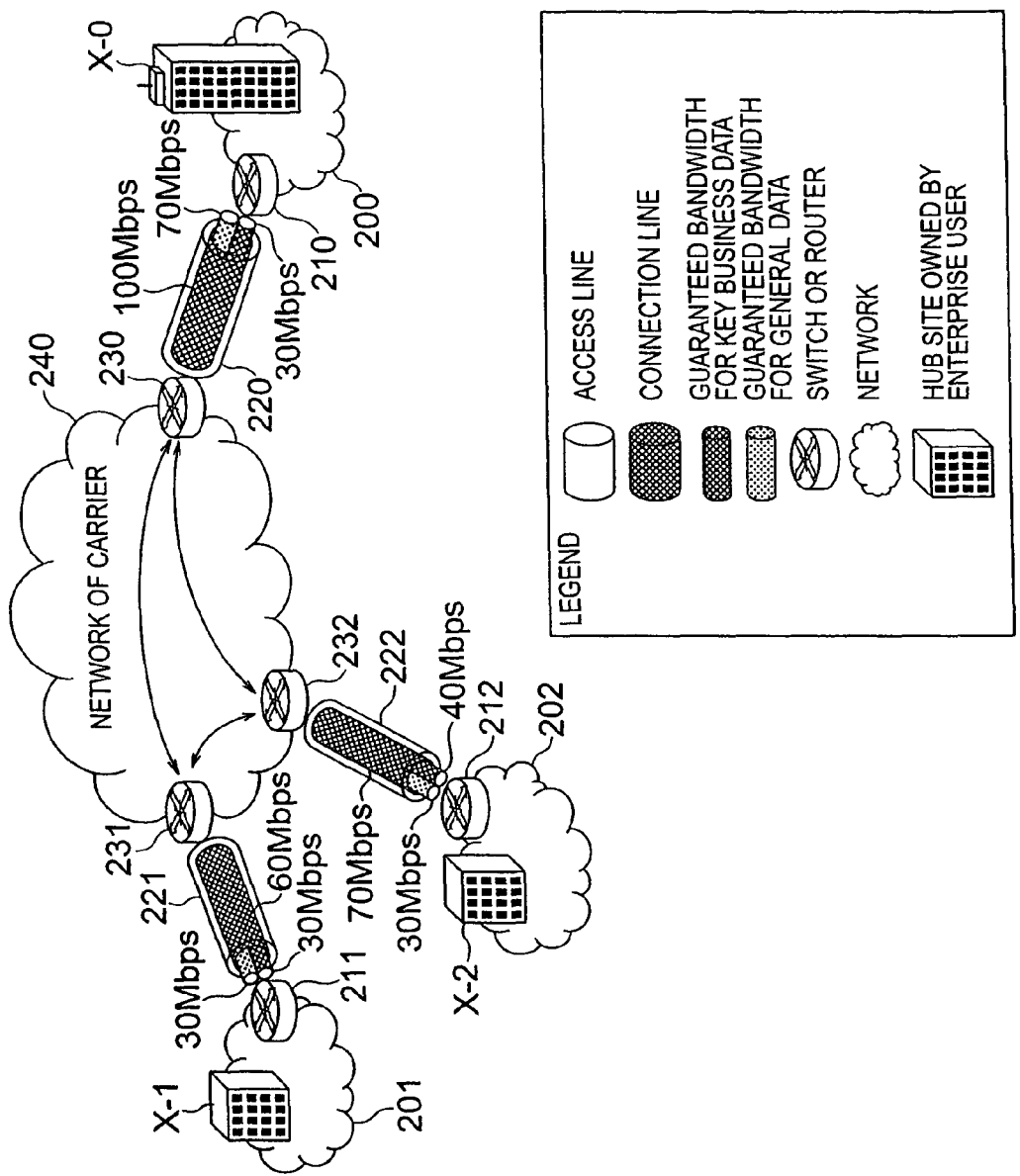
FIG. 2 is a diagram illustrating the configuration of IP-VPN or wide area Ethernet to which the present invention can be applied.
Figure 3:
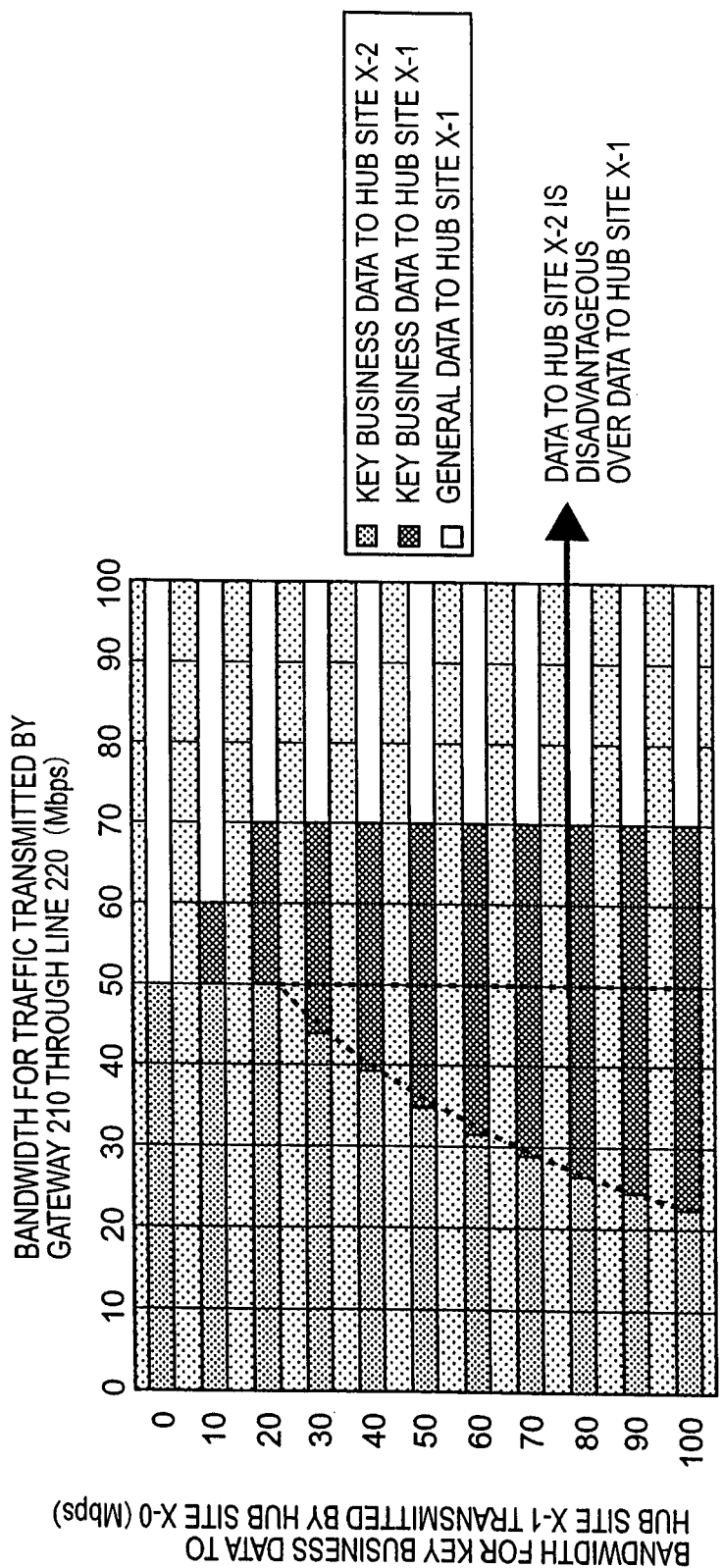
FIG. 3 is a diagram showing a bandwidth allocation in a node 210 when the prior art is employed.
Figure 4:
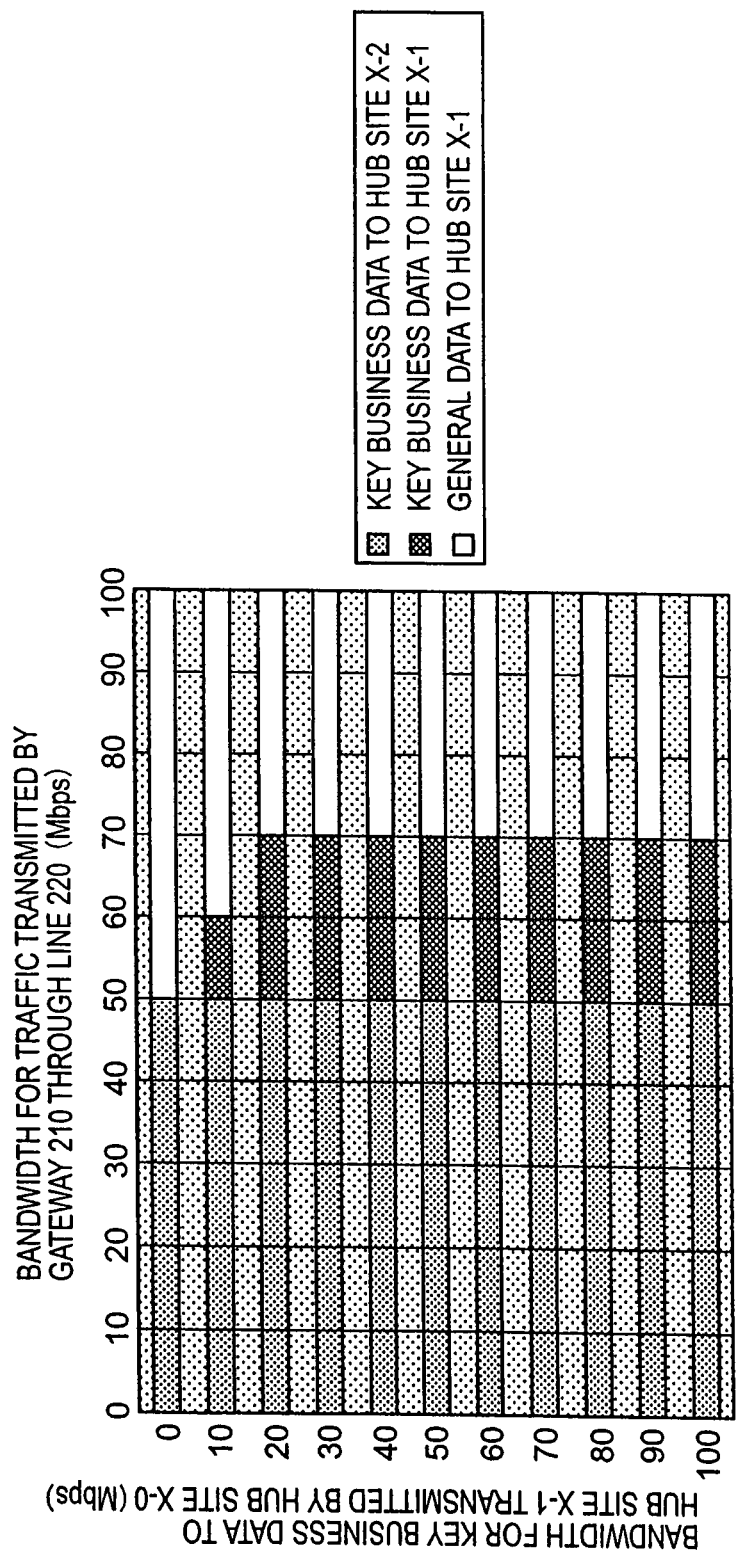
FIG. 4 is a diagram showing a bandwidth allocation in the node when the present invention is employed.

Network configurations contemplated by the present invention involve a wide area Ethernet service and IP-VPN service provided by carriers for enterprise users, examples of which are illustrated in FIG. 2 which is referred to in the following description. In the illustrated network, a certain enterprise X has three hub sites X-0, X-1, X-2, each of which has built an intra-office network 200, 201 or 202. This enterprise X builds an integrated network comprised of a key business data network and a general data network using a bandwidth monitoring function to which techniques of the present invention are applied.

The enterprise X has concluded a contract with a carrier for connection bandwidths of 100 Mbps, 60 Mbps, and 70 Mbps for connection with a network 240 of the carrier, wherein 70 Mbps, 30 Mbps, and 40 Mbps are guaranteed as bandwidths for key business data, and the remaining 30 Mbps of bandwidth is guaranteed as a bandwidth for general data.

At input/output ports of the intra-office networks 200, 201, 202, gateway nodes 210, 211, 212 are installed, respectively, and connected to access lines 220, 221, 222, respectively. These nodes 210, 211, 212 is each provided with a bandwidth monitoring function, to which the techniques of the present invention are applied, to monitor the traffic transmitted by the hub site X-0, X-1, X-2, respectively, to limit the bandwidths of the traffic transmitted by the hub sites X-0, X-1, X-2 to the respective connection bandwidths or less. Also, each of the nodes 210, 211, 212 allocates the connection bandwidth in accordance with the data type such as general data, key business data and the like to ensure certain bandwidths therefor and to limit these data to the certain bandwidths or less within the connection bandwidth. Further, in accordance with the destination, each of the nodes 210, 211, 212 allocates the connection bandwidth to guarantee a certain bandwidth for a type of data and to limit this type of data to the certain bandwidth or less. In this embodiment, in the bandwidth allocation in accordance with the type of data, a bandwidth guaranteeing control is conducted to ensure certain bandwidths for respective types of data. In the bandwidth allocation in accordance with the destination, the bandwidth guaranteeing control is likewise conducted to ensure certain bandwidths for respective types of data. However, the bandwidth allocation in accordance with the type of data is given a higher priority than the bandwidth allocation in accordance with the destination. After this function permits a transmission of a packet, and determines the priority of the packet, the packet is delivered to access lines 220, 221, 222.

Edge nodes 230, 231, 232 in the network 240 of the carrier accommodate the access lines 220, 221, 222, respectively, such that upon receipt of a packet from the enterprise X, the packet is transferred at a transfer rate in accordance with the priority of the packet. Further, upon receipt of a packet transmitted through the network 240, the edge node 230, 231, 232 limits the bandwidth of traffic received by the hub site X-0, X-1, X-2 to the connection bandwidth or less. Each of the edge nodes 230, 231, 232 also allocates the bandwidth to ensure certain bandwidths in accordance with the type of data, such as general data, key business data and the like, within the connection bandwidth and to limit the respective data to the certain bandwidths allocated thereto. Further, each of the edge nodes 230, 231, 232 allocates the bandwidth in accordance with the source to ensure a certain bandwidth and to simultaneously limit data to the allocated certain bandwidth or less. In this embodiment, in the bandwidth allocation in accordance with the type of data, the bandwidth guaranteeing control is conducted to ensure certain bandwidths for the respective types of data, and in the bandwidth allocation in accordance with the source, the bandwidth guaranteeing control is also conducted to ensure certain bandwidths for the respective types of data in a similar manner. Once the bandwidth monitoring function permits the transmission of a packet, the packet is delivered to the access line 220, 221, 222.

Figure 5:
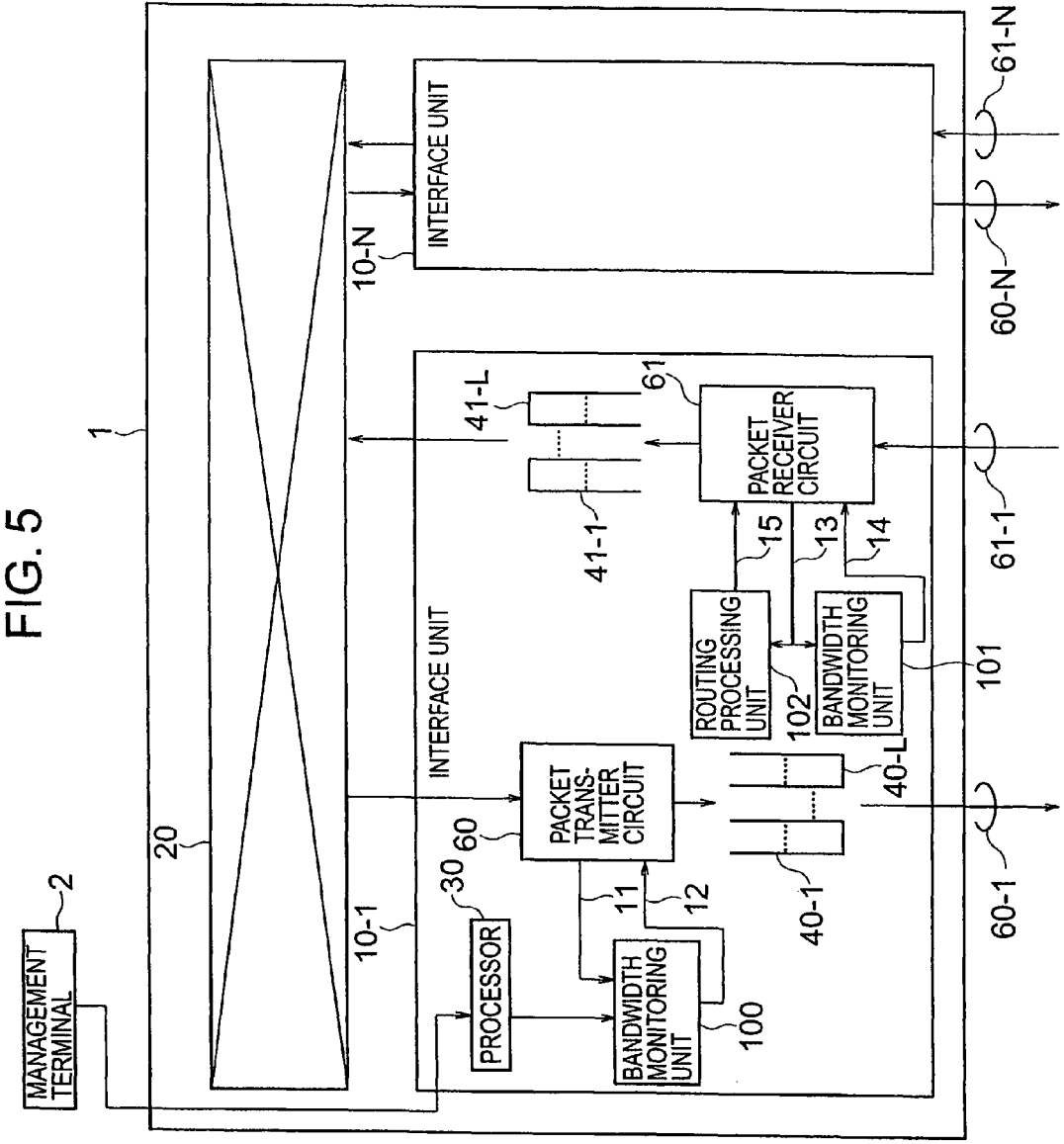
FIG. 5 is a block diagram illustrating the configuration of a router/switch of the present invention.

The operation of the node, which is provided with the band monitoring function of the present invention, will be generally described with reference to FIGS. 5 to 7. FIG. 5 illustrates a node 1 which is provided with the bandwidth monitoring function of the present invention. The node 1, which is provided with the bandwidth monitoring function of the present invention, may be used as the gate way node 210, 211, 212 installed at an inlet/outlet port of the intra-network 200, 201, 202, or the edge node 230, 231, 232 installed at an inlet/outlet port of the network 240 of the carrier. The following description will be made in connection with the gateway node 210 installed in the intra-office network 200 in the hub site X-0 in this embodiment. When the node 1 operates as another node, the node 1 may simply perform the operation described below in a similar manner.

This node sets five monitoring policies so as to satisfy the contract made between the carrier and enterprise X. A first monitoring policy is Monitoring Policy A for limiting packets transmitted by the hub site X-0 to the hub sites X-1, X-2 to the connection bandwidth of 100 Mbps or less. A second and a third monitoring policy are Monitoring Policy B1 for monitoring a guaranteed bandwidth of 70 Mbps for key business data packets transmitted by the hub site X-0 to X-1, X-2, and Monitoring Policy B2 for monitoring a guaranteed bandwidth of 30 Mbps for general data packets transmitted by the hub site X-0 to X-1, X-2. A fourth and a fifth monitoring policy are Monitoring Policy C1 for monitoring a guaranteed bandwidth of 50 Mbps for packets transmitted by the hub site X-0 to the hub site X-1, and Monitoring Policy C2 for monitoring a guaranteed bandwidth of 50 Mbps for packets transmitted by the hub site X-0 to the hub site X-2. Among these five monitoring policies, the bandwidth monitoring is performed based on three monitoring policies which include Monitoring Policy A, Monitoring Policy B1 or B2, and Monitoring Policy C1 or C2.

The node 1 comprises N inbound lines 61-1 (l=1-N); N outbound lines 60-1 (l=1-N); N interface units 10-1 (l=1-N); and a packet relay processing means 20 for coupling the N interface units 10-1. Each interface unit 10-1 comprises a packet receiver circuit 61 for performing reception processing for a received packet; a bandwidth monitoring unit 101 for monitoring the bandwidth of reception traffic to determine a transfer priority within the network 240 of the carrier; a routing processing unit 102 for searching a routing table to determine an identification number (outbound line number) of a line to which a packet is delivered; a plurality of reception buffers 41-$k$ ($k$=1-L) for storing packets, which have undergone the reception processing, according to the priorities until they are transmitted to the packet relay processing means 20; a packet transmitter circuit 60 for performing transmission processing for a packet received from the packet relay processing means 20; a bandwidth monitoring unit 100 for monitoring the bandwidth of transmission traffic to determine a transfer priority within the network 240 of the carrier; and a plurality of transmission buffers 40-$k$ ($k$=1-L) for storing packets, which have undergone the transmission processing, according to the priorities until they are transmitted to the outbound lines. While this embodiment is described in connection with the bandwidth monitoring for the transmission traffic performed by the bandwidth monitoring unit 100, the bandwidth monitoring unit 101 can perform the bandwidth monitoring for the reception traffic in a similar manner.

Figure 6:
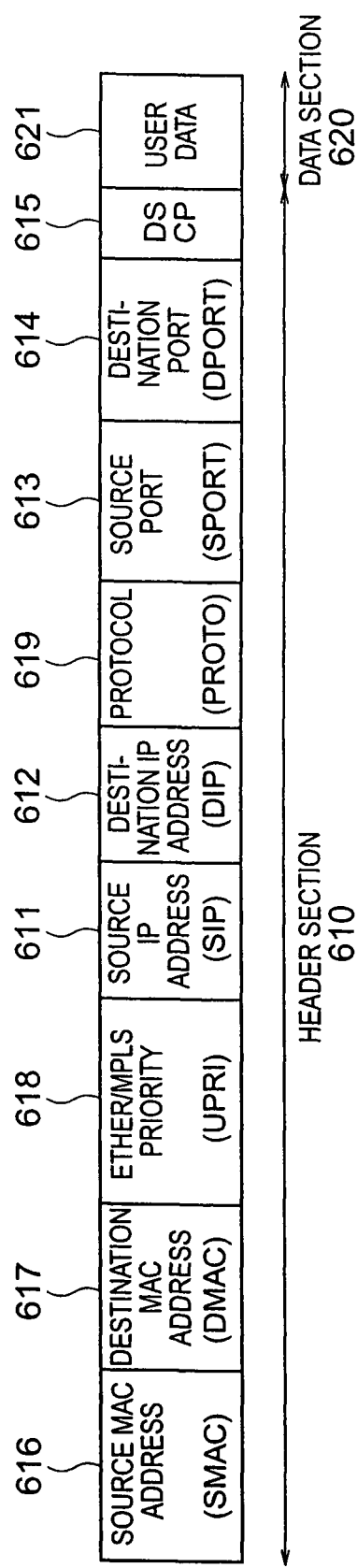
FIG. 6 is a diagram showing a format for a packet in a network.

FIG. 6 shows an example of a packet format in the intra-office networks 200, 201, 202 built in the respective hub sites of the enterprise X, and the network 240 of the carrier. This format is comprised of a header section 610 and a data section 620. The header section 610 is made up of a source IP address (hereinafter called "SIP") 611 which is a source address (the address of a transmitting terminal) on a network layer; a destination IP address (hereinafter called "DIP") 612 which is the destination address (the address of a receiving terminal); a protocol (hereinafter called "PROTO") 619 indicative of a higher level application; a source port (hereinafter called "SPORT") 613 for use by a particular protocol; a destination port (hereinafter called "DPORT") 614; DSCP (Diffserv Code Point) 615 indicative of a transfer priority on the network layer; a source MAC address (hereinafter called "SMAC") 616 which is the source address on a data link layer; a destination MAC address (hereinafter called "DMAC") 617 which is the destination address; and a user priority (hereinafter called "UPRI") 618 of the Ethernet or MPLS (Multi Protocol Label Switching) indicative of a transfer priority on the data link layer. The data section 620 in turn is comprised of user data 621.

Figure 7:
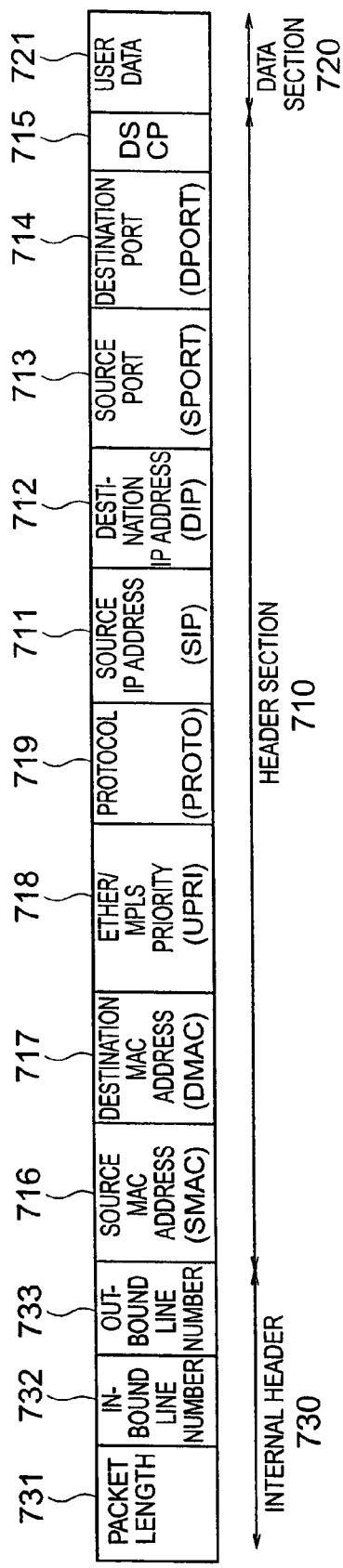
FIG. 7 is a diagram showing a format for a packet in the router/switch of the present invention.
Figure 8:
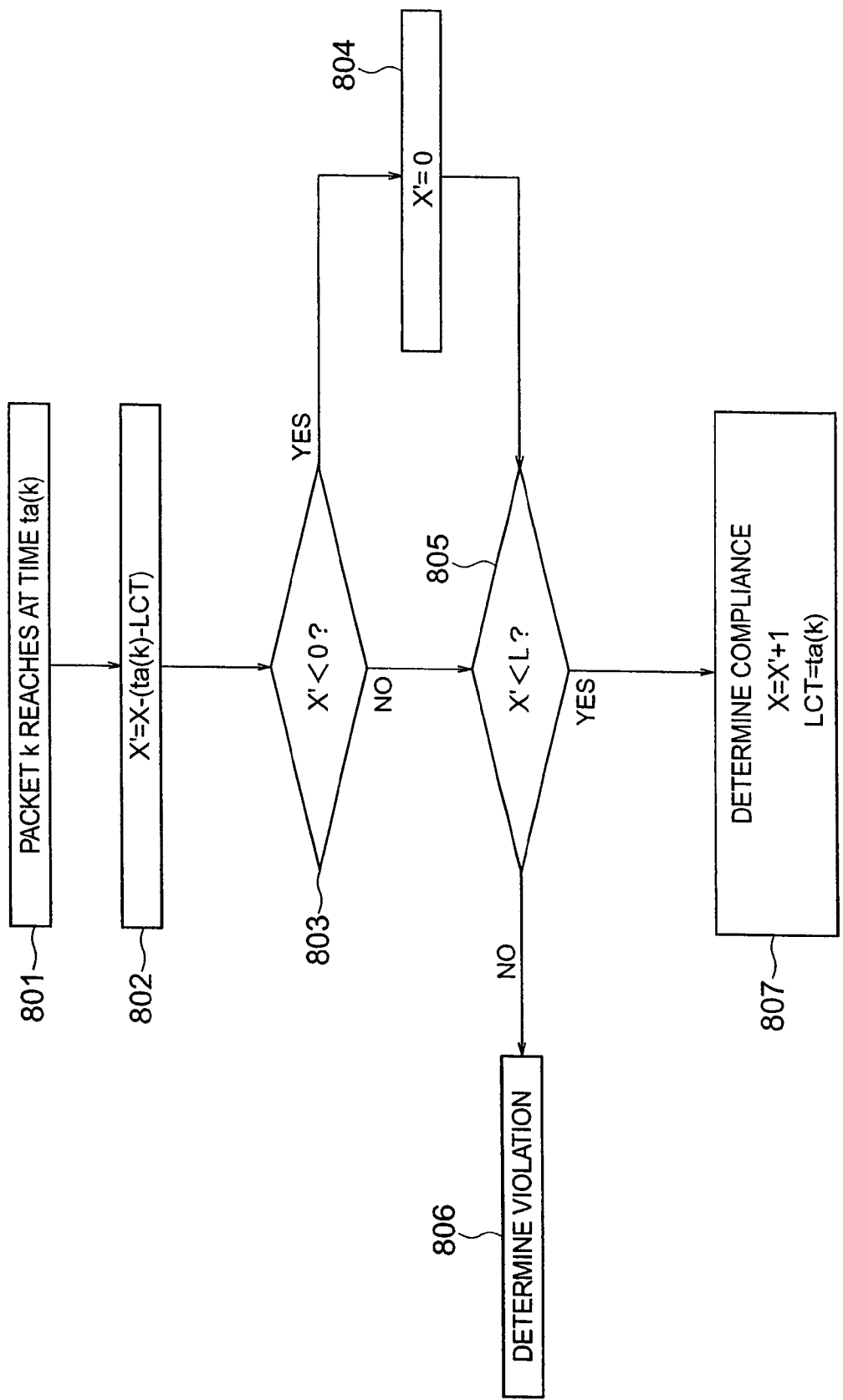
FIG. 8 is a flow chart of a leaky bucket algorithm.

FIG. 7 shows an example of a packet format within the node 1 of the present invention. This format has an internal header section 730 added to the foregoing format shown in FIG. 6. The internal header section 730 is comprised of a packet length 731 indicative of the byte length of the packet; an inbound line number 732 which is an identification number of a line through which the packet is inputted; and an outbound line number 733 which is an identification number of a line through which the packet is delivered.

As a packet is inputted from the inbound line 61-1, the packet receiver circuit 61 adds the internal header section 730 to the packet, counts the byte length of the packet, and writes the byte length into the packet length 731 and the inbound line number of the inbound line 61-1, from which the packet was inputted, into the inbound line number 732. Further, when this packet is once stored, the packet receiver circuit 61 simultaneously transmits information in the internal header section 730 and header section 710, except for the outbound line number 733, to the bandwidth monitoring unit 101 and routing processing unit 102 as packet header information 13.

The bandwidth monitoring unit 101 performs the bandwidth monitoring based on a plurality of monitoring policies to determine to indicate that the packet should be discarded, or determine the transfer priority specified for the packet, and transmits the result of the determination to the packet receiver circuit 61 as processing determination information 14. The routing processing unit 102 determines an outbound line number from information corresponding to DIP 712 or DMAC 717 within the packet header information 13, and transmits the outbound line number to the packet receiver unit 61 as packet outbound line information 15. It should be noted that DIP 712 is used when the node 1 is a router, and DMAC 717 is used when the node 1 is a switch.

Upon receipt of the processing determination information 14 and packet outbound line information 15, the packet receiver circuit 61 discards a packet stored therein when the processing determination information 14 indicate the discarding of the packet. When the processing determination information 15 indicates a transfer priority of the packet, the packet receiver circuit 61 writes a value corresponding to the priority into DSCP 715 or UPRI 718 within the header section 710 of the stored packet, writes the outbound line number within the packet outbound line information 15 into the outbound line number 733 within the packet internal header section 730, and transmits the stored packet to the reception buffer 41-$k$.

The node 1 comprises L reception buffers 41-$k$ in accordance with the value of DSCP 715 or UPRI 718 in the packet, and stores the packet in the reception buffer 41-$k$ corresponding to DSCP 715 or UPRI 718. A buffer 41-1 is the buffer with the highest priority, and the priority is lower as the value k is larger.

The packet relay processing means 20 reads packets from the reception buffers with higher priorities from among the L buffers included in the reception buffers 41-$k$. As a packet is read, the packet relay processing means 20 transfers the packet to the interface unit 10-1 corresponding to the value of the outbound line number 733.

The packet transmitter circuit 60, upon receipt of the packet from the packet relay processing means 20, once stores the packet, and simultaneously transmits information within the packet header section 710 to the bandwidth monitoring unit 100 as packet header information 11.

The bandwidth monitoring unit 100 performs the bandwidth monitoring based on a plurality of monitoring policies, to determine to indicate that a packet should be discarded, or determine the transfer priority specified for the packet, and transmits the result of the determination to the packet transmitter circuit 60 as packet priority information 12.

Upon receipt of the packet priority information 12, the packet transmitter circuit 60 discards a packet stored therein when the packet priority information 12 indicates the discarding of the packet. When the packet priority information 12 indicates the transfer priority of the packet, the packet transmitter circuit 60 writes a value corresponding to the priority into DSCP 715 or UPRI 718 within the header section 710 of the stored packet. Further, the packet transmitter circuit 60 deletes the internal packet section 730 from the packet, and transmits the resulting packet to the transmission buffer 40-$k$.

The node 1 comprises L transmission buffers 40-$k$ in accordance with the value of DSCP 615 or UPRI 618, and stores the packet in the transmission buffer 40-$k$ corresponding to DSCP615 or UPR1618 packets. A buffer 40-1 is the buffer with the highest priority, and the priority is lower as the value k is larger. Packets are read from the transmission buffers 40-$k$ with higher priorities, from among the transmission buffers 40-$k$ for transmission to the outbound lines 60-1.

Figure 1:
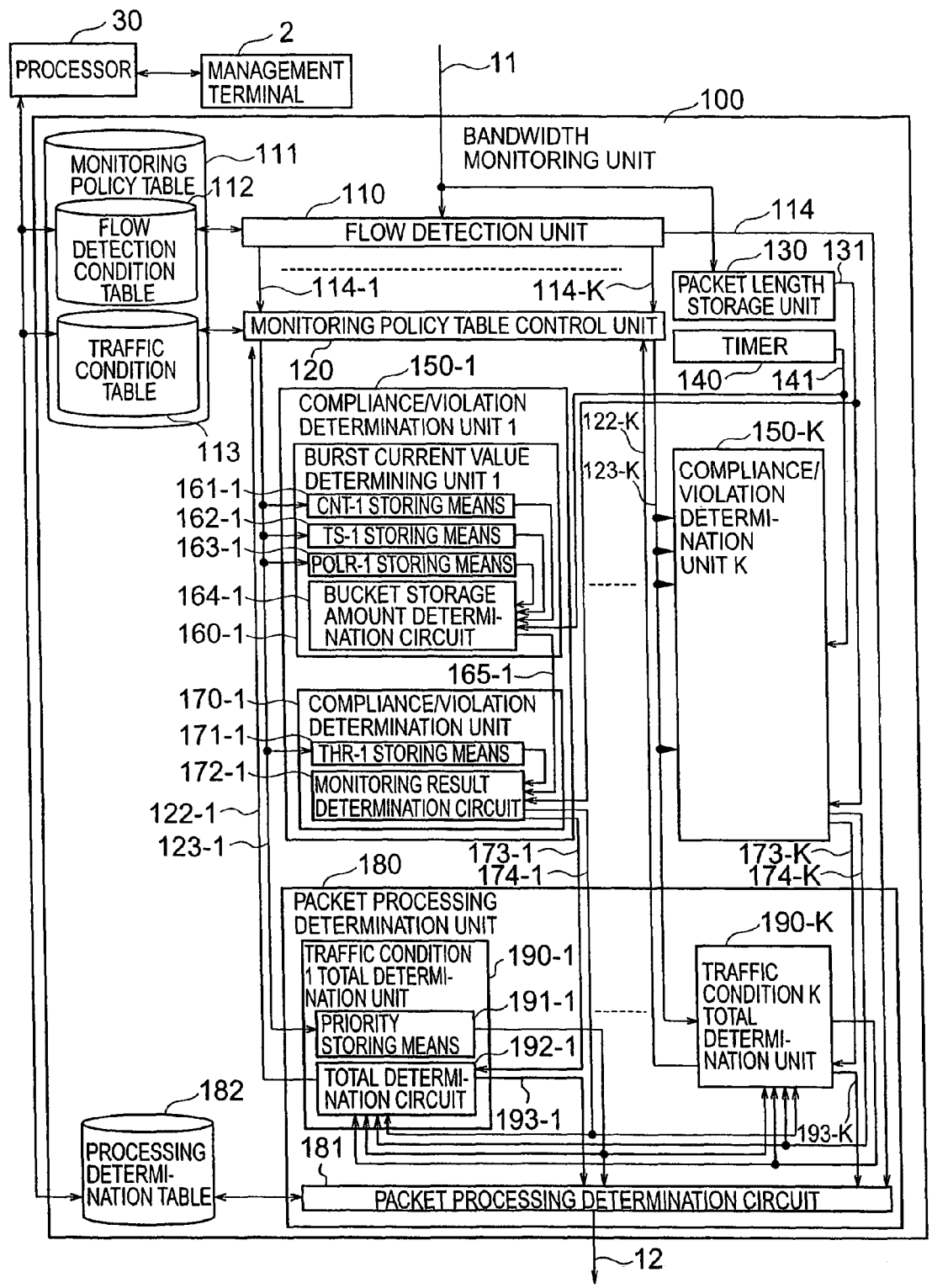
FIG. 1 is a block diagram illustrating the configuration of a bandwidth monitoring unit 100 according to the present invention.

Next, the operation of the present invention will be described in greater detail with reference to FIGS. 1, 7, 9, 10, 11, 12, 13. The bandwidth monitoring unit 100 of the present invention employs the leaky packet algorithm as a bandwidth monitoring algorithm. FIG. 1 illustrates a block diagram of the bandwidth monitoring unit 100. The bandwidth monitoring unit 100 comprises a flow detector unit 110 which compares one or a plurality of flow detection conditions including at least one piece of information, among information in the header field of a packet, with information in the header field of an input packet corresponding to the flow detection condition(s) to determine one or a plurality of matching flow detection condition; a monitoring policy table 111 for storing the flow detection conditions, and a plurality of monitoring policies which present traffic conditions corresponding to the flow detection conditions; a monitoring policy table control unit 120 for reading and writing each monitoring policy from and into the monitoring policy table 111; a packet length storage unit 130 for holding the packet length of an input packet; a timer 140 for generating a current time; compliance/violation determination units 150-$n$ (n=1-k) each for determining compliance/violation to respective traffic conditions within the one or plurality of matching monitoring policies; a packet processing determination unit 180 for determining the priority for an input packet, and determining whether the packet should be discarded; and a processing determination table 182. In this embodiment, while flow detection conditions of the monitoring policies A, B1, B2, C1, C2 are set in the monitoring policy table 111, a packet can simultaneously match three flow detection conditions at maximum, thus the number K of the compliance/violation determination units may be three or more. When a packet can match more flow detection conditions, four or more compliance/violation determination units may be provided.

Figure 12:
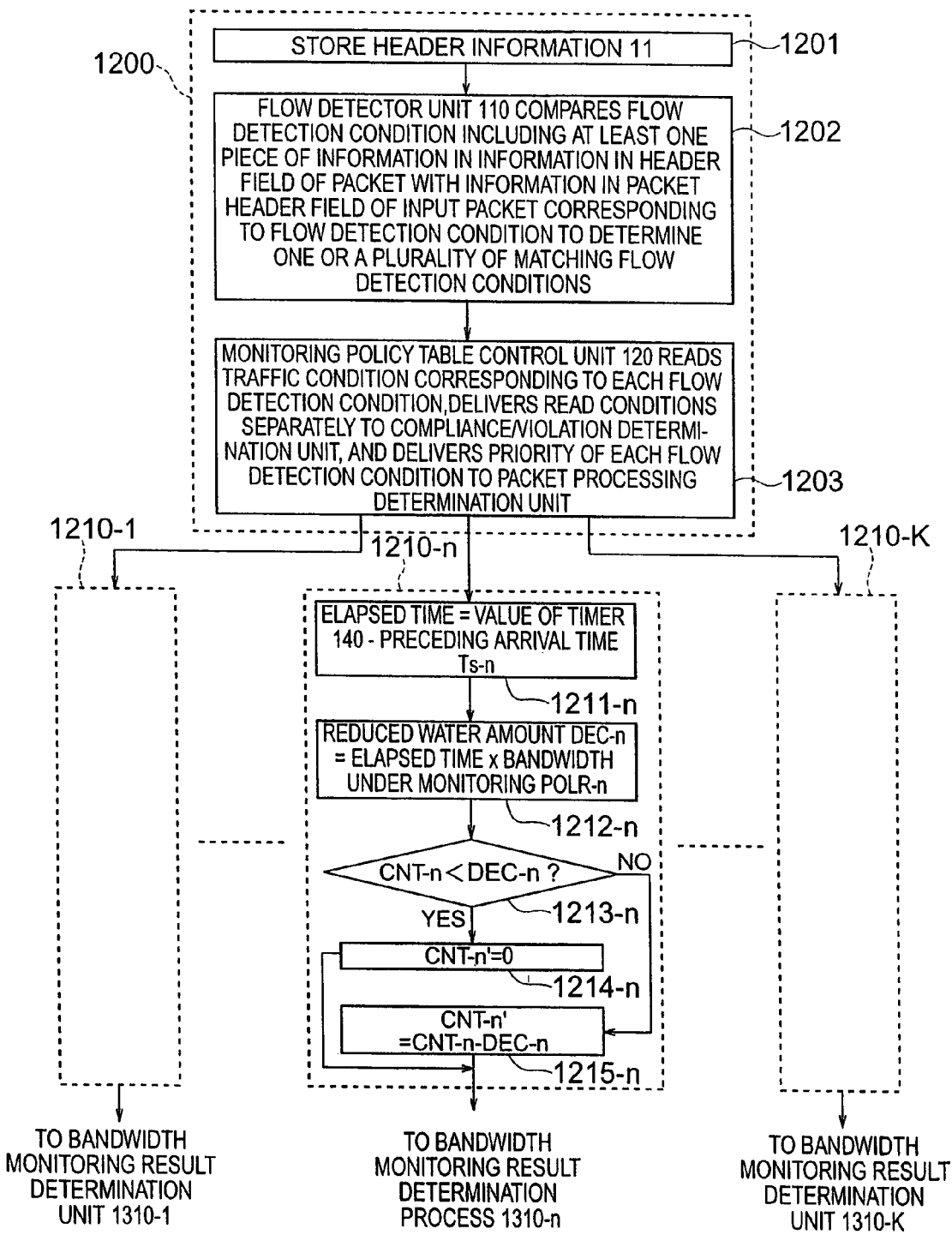
FIG. 12 is a flow chart illustrating a policing starting process 120 and a burst current value determination process 1210-*n*.
Figure 13:
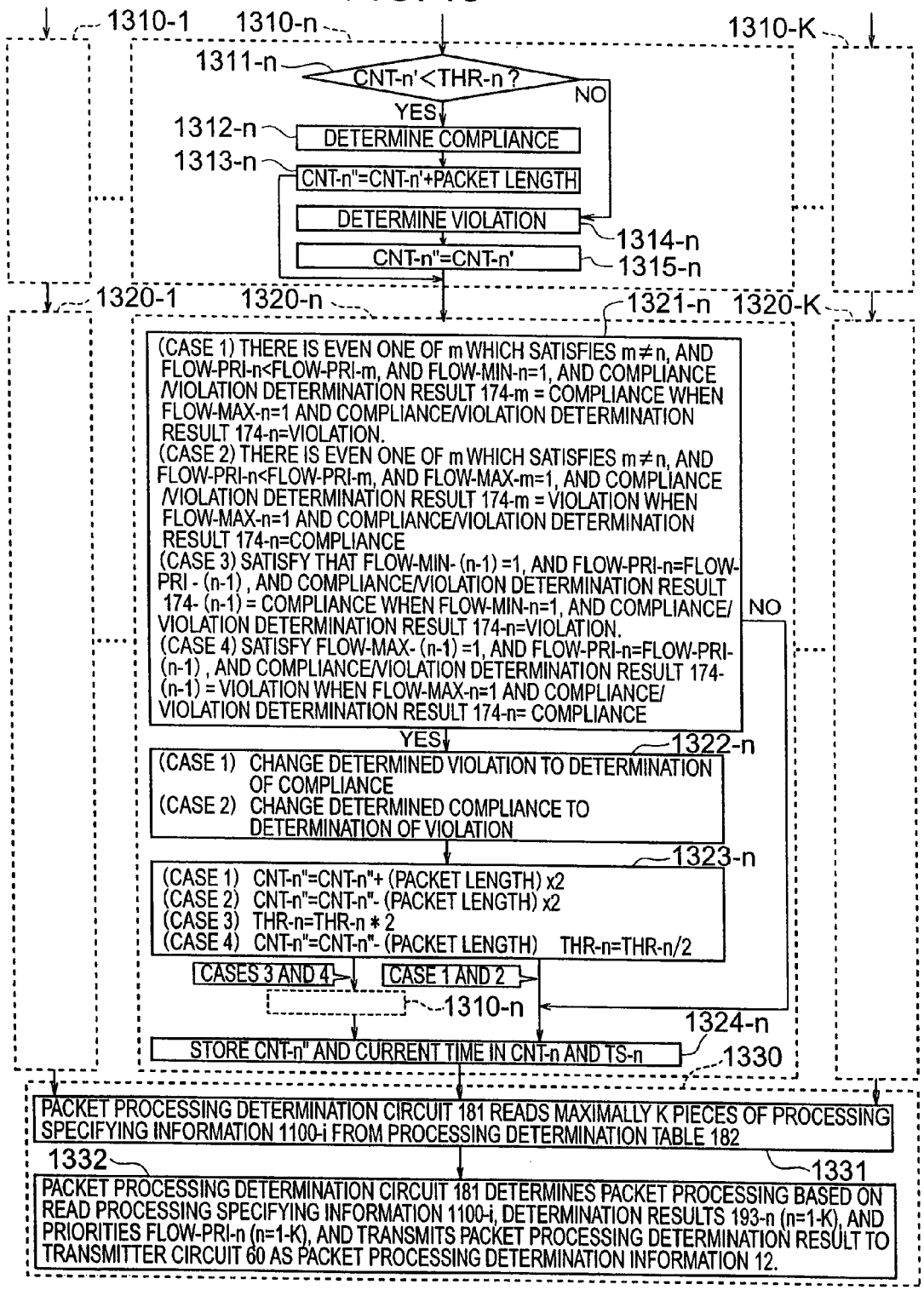
FIG. 13 is a flow chart illustrating a compliance/violation determination process 1310-*n*, a total determination process 1320-*n*, and a packet processing determination process 1330.
Figure 14:
FIG. 14 is a Venn diagram showing flows which conforms to detection conditions A1, B1, B2.
Figure 15:
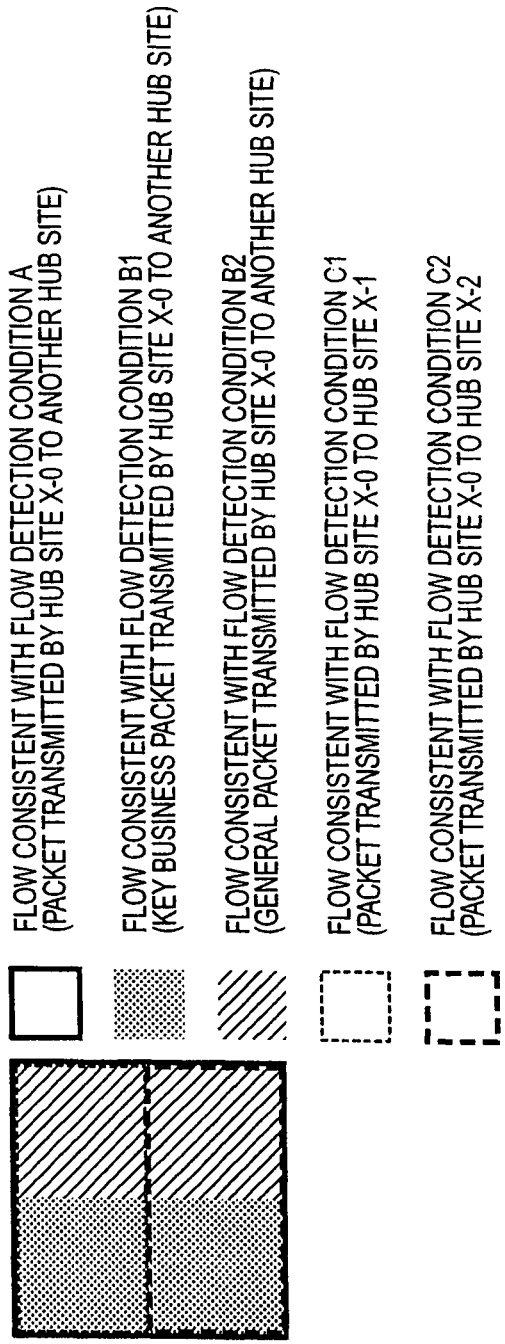
FIG. 15 is a Venn diagram showing flows which conforms to detection conditions A, B1, B2, C1, C2.

FIGS. 12 and 13 illustrate a former half and a latter half of a flow chart representing a process executed by the bandwidth monitoring unit 100. The process associated with the bandwidth monitoring unit 100 is made up of a policing start process 1200; a burst current value determination process 1210-$n$ (n=1-K) and a compliance/violation determination process 1310-$n$ (n=1-K) each for determining compliance/violation for an n-the monitoring policy; a total determination processes 1320-$n$ (n=1-K) for making a total determination based on maximally K compliance/violation determination results and priority information of flow detection conditions, later described; and a packet processing determination process 1330 for making a determination to indicate that a packet should be discarded, or a determination to indicate the transfer priority for the packet based on these total determination results. The processes 1210-$n$ and 1310-$n$ are executed by the compliance/violation determination unit 150-$n$ associated with the n-the monitoring policy, while the processes 1320-$n$ (n=1-K) and 1330 are executed by the packet processing determination unit 180.

As the bandwidth monitoring unit 100 receives the packet header information 11, the policing start process 1200 is first executed, where the flow detector unit 110 stores information corresponding to SIP 711, DIP 712, PROTO 719, SPORT 713, DPORT 714, DSCP 715, SMAC 716, DMAC 717, and UPRI 718, and the packet length storage unit 130 stores information corresponding to the packet length 731 (step 1201).

At step 1202, the packet header information 11 stored by the flow detector unit 110 is compared with the flow detection conditions 900-$i$ (i=1-M) held by the monitoring policy table 111 as shown in FIG. 9 to detect one or a plurality (K at maximum) of matching flow detection conditions 900-$i$, and table address number information 114-$n$ (n=1-K), which describes each flow detection condition 900-$i$, is sent to the monitoring policy table control unit 120. The value of n is assigned in an order from the smallest i. For example, when the packet header information 11 matches a flow detection condition 900-2 and a flow detection condition 900-5, 114-1 is assigned to table address number information which describes the flow detection condition 900-2, and 114-2 is assigned to the table address number information which describes the flow detection condition 900-5.

Further, one or a plurality of pieces of entry number information 114-$n$ (n=1-K), which describes one or a plurality (K at maximum) of detected flow detection conditions 900-$i$, is transmitted to the packet processing determination circuit 181 in the packet processing determination unit 180 as all-table address number information 114 (114-1-114-K).

Therefore, when there are first flow detection condition and second flow detection condition which share some items of the first flow detection condition, for a packet which satisfies the shared condition items, two table address number information 114-1, 114-2, which correspond to the first and second flow detection conditions that include the shared condition items, are sent to the monitoring policy table control unit 120, while the all-table address number information 114 comprised of the table address number information 114-1, 114-2 is transmitted to the packet processing determination circuit 181 in the packet processing determination unit 180. For a packet which matches the first flow detection conditions but does not satisfy the condition items commonly shared by the first flow detection conditions and second flow detection conditions, single table address number information 114-1 corresponding to the first flow detection conditions is sent to the monitoring policy table control unit 120, and the all-table address number information 114 comprised only of the table address number information 114-1 is transmitted to the packet processing determination circuit 181 in the packet processing determination unit 180. For a packet which matches the second flow detection conditions but does not satisfy the condition items commonly shared by the first flow detection conditions and second flow detection conditions, single table address number information 114-1 corresponding to the second flow detection conditions is sent to the monitoring policy table control unit 120, and the all-table address number information 114 comprised only of the table address number information 114-1 is transmitted to the packet processing determination circuit 181 in the packet processing determination unit 180. In the foregoing manner, when there is second flow detection condition which shares some items of the first flow detection condition, three types of table address number information 114-$n$ are transmitted as the table address number information 114-$n$, including two pieces of table address number information 114-1, 114-2 corresponding to the first and second flow detection conditions, and single table address number information 114-1 corresponding to the first or second flow detection conditions. On the other hand, S. Blake et al., "An Architecture for Differentiated Services" only takes into consideration flow detection conditions in a unilateral comprehensive relationship, so that there are two types of table address number information 114-$n$ which are to be transmitted.

The contents of the flow detection conditions 900-$i$ (i=1-M) held by the monitoring policy table 111 will be described below in detail. The monitoring policy table 111 is made up of a flow detection condition table 112 (FIG. 9) for storing M flow detection conditions 900-$i$ (i=1-M), and a traffic condition table 113 (FIG. 10) for storing M traffic conditions 1000-$i$ (i=1-M). In this embodiment, M may be five or more because five monitoring policies A, B1, B2, C1, C2 are set. Also, in this embodiment, in order that the compliance/violation determination results for the monitoring policies C1, C2 affect the compliance/violation determinations for the monitoring policies B1, B2, the monitoring policies C1, C2 are described in entries previous to the monitoring policies B1, B2. For example, the flow detection conditions and traffic conditions of the monitoring policies C1, C2 are set in 900-2, 900-3 and 1000-2, 1000-3, respectively, while the flow detection conditions and traffic conditions of the monitoring policies B1, B2 are set in 900-4, 900-5 and 1000-4, 1000-5, respectively.

FIG. 9 shows an exemplary format for the flow detection condition table 112. The flow detection condition 900-$i$ held in the flow detection condition table 112 is comprised of FLOW-SIP 901-$i$ (i=1-M) indicative of a condition for the source IP address; FLOW-DIP 902-$i$ (i=1-M) indicative of a condition for the destination IP address; FLOW-SPORT 903-$i$ (i=1-M) indicative of a condition for the source port; FLOW-DPORT 904-$i$ (i=1-M) indicative of a condition for the destination port; FLOW-SDCP 905-$i$ (i=1-M) indicative of a condition for the transfer priority on the network layer; FLOW-SMAC 906-$i$ (i=1-M) indicative of a condition for the source MAC address; FLOW-DMAC 907-$i$ (i=1-M) indicative of a condition for the destination MAC address; FLOW-UPRI 908-$i$ (i=1-M) indicative of a condition for the Ether/MPLS priority which indicates the transfer priority for the data link layer; and FLOW-PROTO 912-$i$ (i=1-M) indicative of a condition for the protocol, and also includes FLOW-PRI 909-$i$ (i=1-M) indicative of the priority for the flow detection condition; FLOW-MAX 910-$i$ (i=1-M) for recording "1" when a monitoring policy is intended to limit to a certain bandwidth or less; and FLOW-MIN 911-$i$ (i=1-M) for recording "1" when a monitoring policy is intended to guarantee a certain bandwidth.

The value of FLOW-PRI 909-$i$ is determined in the following manner. The monitoring policies may be classified into two types, i.e., a monitoring policy for limiting to a certain bandwidth or less, and a monitoring policy for guaranteeing a certain bandwidth. The monitoring policy for limiting to a certain bandwidth or less is intended to discard a packet or degrade the priority of the packet when it is determined to violate a traffic condition. On the other hand, the bandwidth policy for guaranteeing a certain bandwidth is intended to instruct a transfer of a packet when it is determined to comply with a traffic condition. When a packet is determined to violate a traffic condition by the monitoring policy for limiting to a certain bandwidth and is determined to comply with the traffic condition by the monitoring policy for guaranteeing a certain bandwidth, a contention arises in terms with how the packet should be processed. When such a contention occurs, a priority is written into FLOW-PRI 909-$i$ for determining which determination result is preferentially taken.

In this embodiment, there are the monitoring policy A for limiting to a certain bandwidth, and the monitoring policies B1, B2, C1, C2 for guaranteeing a certain bandwidth. It is necessary to accomplish an impartial bandwidth allocation between the traffic from the node 210 to the hub site X-1 and the traffic from the node 210 to the hub site X-2 and to simultaneously guarantee a certain bandwidth for each type of data to keep the contract between the enterprise X and the carrier. For this reason, the monitoring policies B1, B2 are given an equal priority to the monitoring policies C1, C2. The lowest priority is given to the monitoring policy A. Since the priority of a monitoring policy to which a flow detection condition belongs is indicated by FLOW-PRI 909-$i$, and the types of traffic conditions corresponding to the flow detection conditions (bandwidth limiting type or bandwidth guaranteeing type) are indicated by FLOW-MAX 910-$i$ and FLOW-MIN 911-$i$, respectively, the values of [FLOW-PRI 909-$i$, FLOW-MAX 910-$i$, FLOW-MIN 911-$i$] corresponding to the monitoring policies A, B1, B2, C1, C2 are set to [1,1,0], [2,0,1], [2,0,1], [2,0,1], [2,0.1] and the like.

For identifying whether a packet is directed to which of hub sites (hub sites X-0, X-1, X-2 in this embodiment) possessed by the user in a flow detection, each hub site may have declared, for example, the IP address of a terminal belonging to that hub site to the carrier which manages the network 240, thus making it possible to determine the source and destination hub sites from the IP addresses. Also, for identifying a data type (key business data and general data in this embodiment), the manager of each hub site may have declared that packets transmitted by a terminal having a particular IP address are the key business data packets, and remaining packets are the general packets, thus permitting the flow detector unit 110 to determine the data type from information corresponding to SIP 711.

At step 1203, the monitoring policy table control unit 120 generates an address(es) corresponding to one or a plurality of pieces of table address number information 114-$n$ specified by the flow detector unit 110, reads a corresponding traffic condition(s) 1000-$i$ (i=1-M) from the traffic condition table 113 in the monitoring policy table 111, and separately transmits the generated address(es) and the read traffic condition (s) 1000-$i$ to different compliance/violation determination units 150-$n$ as communication information 123-$n$ (n=1-K). Also, the monitoring policy table control unit 120 reads the priorities FLOW-PRI 909-$i$, FLOW-MAX 910-$i$, and FLOW-MIN 911-$i$ for a corresponding flow detection condition from the flow detection condition table 112 of the monitoring policy table 111, and transmits the read priorities, included in the communication information 123-$m$, to the priority storing means 191-$n$ in the packet processing determination unit 180.

Figure 10:
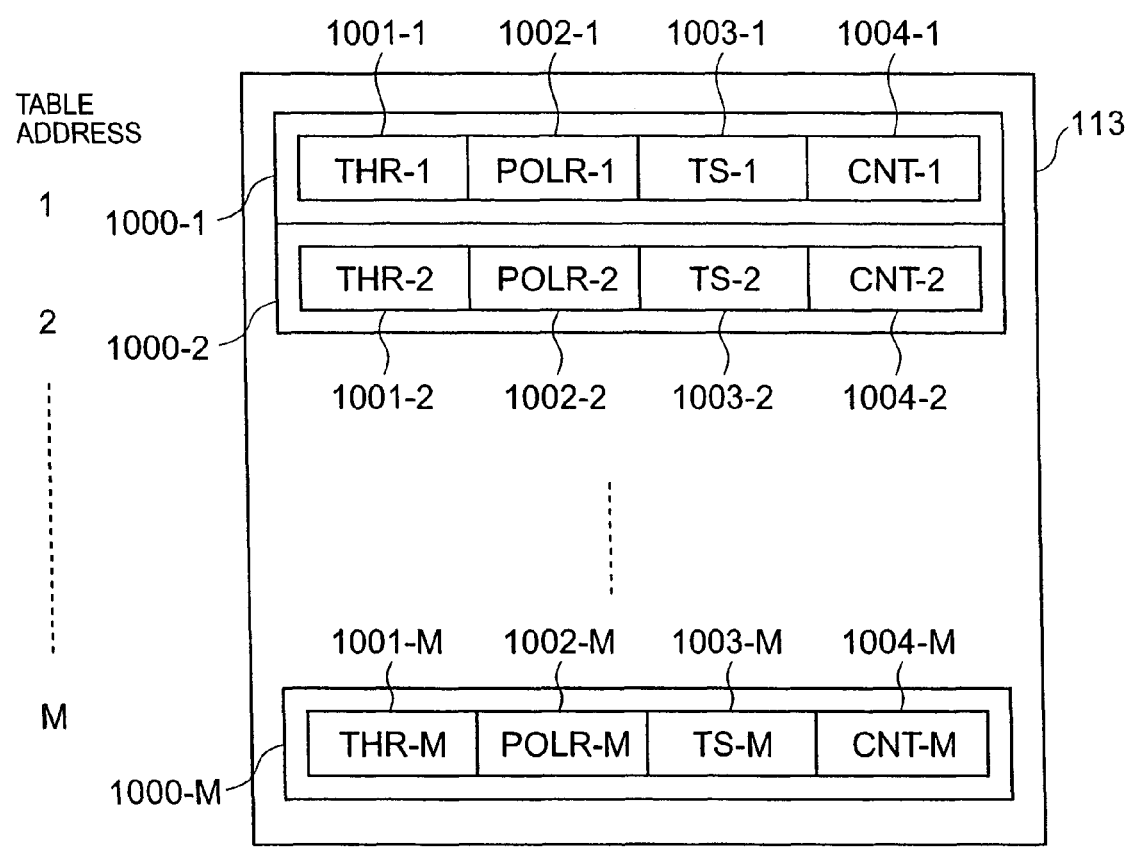
FIG. 10 is a diagram showing a format for a traffic condition table 113.

FIG. 10 shows an exemplary format for the traffic condition table 113. A traffic condition 1000-$i$ held in the traffic condition table 113 is comprised of a bucket capacity THR-i (in bytes) 1001-$i$ (i=1-M); POLR-i (in bytes/sec) 1002-$i$ (i=1-M) which is a rate of a leak from a bucket and indicates a monitored band; a time TS-i (in second) 1003-$i$ (i=1-M) at which a packet, which referenced the same traffic condition 1000-$i$, reached the preceding time; and a water amount CNT-i (in bytes) 1004-$i$ (i=1-M) stored in the bucket immediately after the bandwidth monitoring for the previous packet.

The bucket capacity THR-i (in bytes) 1001-$i$ is transmitted to a THR-n storing means 171-$n$; POLR-i (in bytes/sec) 1002-$i$, which is the rate of a leak from the bucket and indicates the monitored band, is transmitted to a POLR-n storing means 163-$n$; the time TS-i (in seconds) 1003-$i$ at which a packet reached the preceding time is transmitted to a CNT-n storing means 161-$n$; and the priority information FLOW-PRI 909-$i$ for each flow detection condition, read from the flow detection condition table 112, is transmitted to the priority storing means 191-$n$, and separately stored therein.

As the policing starting process 1200 is terminated, the compliance/violation determination process is executed for each traffic condition.

In the burst current value determination process 1210-$n$ (n=1-K), the burst current value determination unit 160-$n$ determines the amount of water in the bucket (bucket storage amount) immediately before a packet is inputted. First, a bucket storage amount determination circuit 164-$n$ calculates the difference between a current time value 141 of the timer 140 indicative of the current time and a time, within the TS-n storing means 162-$n$, at which the preceding packet reached, to calculate an elapsed time from the arrival of the preceding packet (step 1211-$n$).

Next, the elapsed time is multiplied by the value in the POLR-n storing means 163-$n$ to calculate the amount DEC-n of water which has leaked from the arrival of the preceding packet (reduced water amount) (step 1212-$n$). Further, this amount of reduced water is compared with the value in the CNT-n storing means 161-$n$ (amount of water originally stored in the bucket) (step 1213-$n$), and the amount CNT-n' of water stored in the bucket after the subtraction of the reduced water amount is set to zero when the reduced water amount is larger than the amount of water originally stored in the bucket, while the amount CNT-n' of water stored in the bucket after the subtraction of the reduced water amount is set to the difference between CNT-n and DEC-n when the reduced water amount is smaller than the amount of water originally stored in the bucket (step 1215-$n$). Information 165-$n$ of CNT-n, after the calculation is over, is transmitted to the compliance/violation determination unit 170-$n$ (n=1-K).

In the compliance/violation determination process 1310-$n$, a monitoring result determination circuit 172-$n$ of the compliance/violation determination unit 170-$n$ determines whether or not the amount of water stored in the bucket, as determined by the burst current value determination unit 160-$n$, falls within a bucket threshold. Specifically, the monitoring result determination circuit 172-$n$ compares the value THR-n indicative of the bucket capacity in the THR-i storing means 171-$n$ with the value CNT-n' indicative of the amount of water determined by the burst current value determination unit 160-$n$ (step 1311).

When CNT-n'<THR-n, showing that the bucket will not overflow, the input packet is determined to be a compliant packet (step 1312), and the amount CNT-n" of water stored in the bucket, used when the next packet reaches, is set to the sum of CNT-n' and packet length 131 (step 1313). When CNT-n'≧THR-n, showing that the bucket is overflowing, the input packet is determined to be a violating packet (step 1314), and the value of CNT-n' is set to the amount CNT-n" of water stored in the bucket which is used when the next packet reaches (step 1315). Further, information 173-$n$ including the amount CNT-n" of water stored in the bucket which is used when the next packet reaches, the packet length, and the value THR-n indicative of the bucket capacity, is transmitted to the total determination unit 190-$n$ in the bucket processing determination unit 180, while the compliance/violation determination result 174-$n$ is transmitted to all total determination units 190-$n$ (n=1-K) in the packet processing determination unit 180.

In the total determination process 1320-$n$, when a contention occurs in terms of the packet processing due to a determination made to a packet as violating the monitoring policy for limiting to a certain bandwidth or less and a determination made to the same packet as complying with a monitoring policy for guaranteeing a certain bandwidth, a compliance/violation determination result with a lower priorities is replaced with a compliance/violation determination result with a higher priority based on the priorities FLOW-PRI-$n$ (n=1-K) stored in the priority storing means 191-$n$ (n=1-K). Further, the amount CNT-n of water stored in the bucket used when the next packet reaches is changed to CNT-n"+(packet length)×2 when a violating packet is changed to a compliant packet, and to CNT-n"-(packet length)×2 (or to zero if this calculation results in less than zero) when a compliant packet is changed to a violating packet.

Further, in the total determination process 1320-$n$, if there are a plurality of monitoring policies which are equal in priority, identical in the type of traffic condition, and different in compliance/violation determination result from one another, the compliance/violation determinations with larger value of n are made again based on the compliance/violation determination results 174-$n$ with a smaller value of n. Further, when a monitoring policy with a smaller value of n is of the bandwidth guaranteeing type, and is determined to be complied with by a packet, THR-n is replaced with THR-n×2, and the compliance/violation determination is again made for the packet with respect to monitoring policies with larger values of n. When a monitoring policy with a smaller value of n is of the bandwidth limiting type, and is violated by a packet, THR-n is replaced with THR-n/2, and the compliance/violation determination is again made for the packet with respect to monitoring policies with larger values of n. Details on the foregoing process will be described below.

The total determination circuit 192-$n$ of the total determination unit 190-$n$ receives all compliance/violation determination results 174-$n$ (n=1-K); the amount CNT-n" of water stored in the bucket for use at the arrival of the next packet, the value THR-n indicative of the bucket capacity; the information 173-$n$ on the packet length; and all the priorities FLOW-PRI-n (n=1-K) stored in the priority storing means 191-$n$ (n=1-K), FLOW-MAX-n (n=1-K), and FLOW-MIN-n (n=1-K).

Based on the foregoing information, the process performed by the compliance/violation determination unit 170-$n$ is modified in the following manner (step 1321-$n$) when FLOW-PRI-$n$<FLOW-PRI-$m$ for any m except for n, FLOW-MIN-m=1, and Compliance/Violation Determination Result 174-$m$=Compliance with FLOW-MAX-n=1 and Compliance/Violation Determination Result 174-$n$=Violation (labeled "Case 1"); or when FLOW-PRI-n<FLOW-PRI-$m$ for any m except for n, FLOW-MAX-m=1, and Compliance/Violation Determination Result 174-$m$=Violation with FLOW-MIN-n=1 and Compliance/Violation Determination Result 174-$n$=Compliance (labeled "Case 2"); or when FLOW-MIN-(n−1)=1, FLOW-PRI-$n$=FLOW-PRI-(n−1), and Compliance/Violation Determination Result 174-($n$−1)=Compliance with FLOW-MAX-n=1, and Compliance/Violation Determination Result 174-$n$=Violation (labeled "Case 3"); or when FLOW-MAX-(n−1)=1, FLOW-PRI-$n$=FLOW-PRI-(n−1), and Compliance/Violation Determination Result 174-($n$−1)=Violation with FLOW-MAX-n=1 and Compliance/Violation Determination Result 174-$n$=Compliance (labeled "Case 4").

In Case 1, the Compliance/Violation determination result 174-$n$ received from the compliance/violation determination unit 170-$n$ is changed to Compliance (step 1322-$n$), and the amount CNT-n" of water stored in the bucket for use at the arrival of the next packet is changed to CNT-n"+(packet length)×2 (step 1323-$n$).

In Case 2, the compliance/violation determination result 174-$n$ received from the compliance/violation determination unit 170-$n$ is changed to Violation (step 1332-$n$), and the amount CNT-n" of water stored in the bucket for use at the arrival of the next packet is changed to CNT-n"-(packet length)×2 (to zero when the calculation results in zero) (step 1323-$n$).

In Case 3, the value THR-n indicative of the bucket capacity is increased by a factor of two (step 1323-$n$), and the processing at step 1310-$n$ is again executed to acquire a new compliance/violation determination result 193-$n$.

In Case 4, the amount CNT-n' of water stored in the bucket after the subtraction of the reduced water amount is reduced to CNT-n" minus the packet length, and the value THR-n indicative of the bucket capacity is reduced by a factor of two (step 1323-$n$), and the processing at step 1310-$n$ is again executed to acquire a new compliance/violation determination result 193-$n$.

The changed compliance/violation determination results 193-$n$ ($n$=1-K) are transmitted to the packet processing determination circuit 181. Also, the value of the changed amount CNT-n" of water stored in the bucket for use at the arrival of the next packet, and the current time value are transmitted to the monitoring policy table control unit 120 as update information 122-$n$ ($n$=1-K). The monitoring policy table control unit 120 writes these values into the traffic condition table 113 of the monitoring policy table 111 at the addresses generated at step 1203 (step 1324-$n$).

In the packet processing determination process 1330, the packet processing determination circuit 181 generates addresses based on all table address number information 114 (114-1-114-K) received from the flow detector unit 110, and reads processing specifying information 1100-$i$ corresponding to all compliance/violation determination results 193-$n$ ($n$=1-K) for all the monitoring policies from the processing determination table 182, respectively. K pieces of the processing specifying information 1100-$i$ are read at maximum. In this embodiment, a total of three pieces of processing specifying information 1100-$i$ are read corresponding to the monitoring policy A, one of B1 and B2, and one of C1 and C2 (step 1331).

Figure 11:
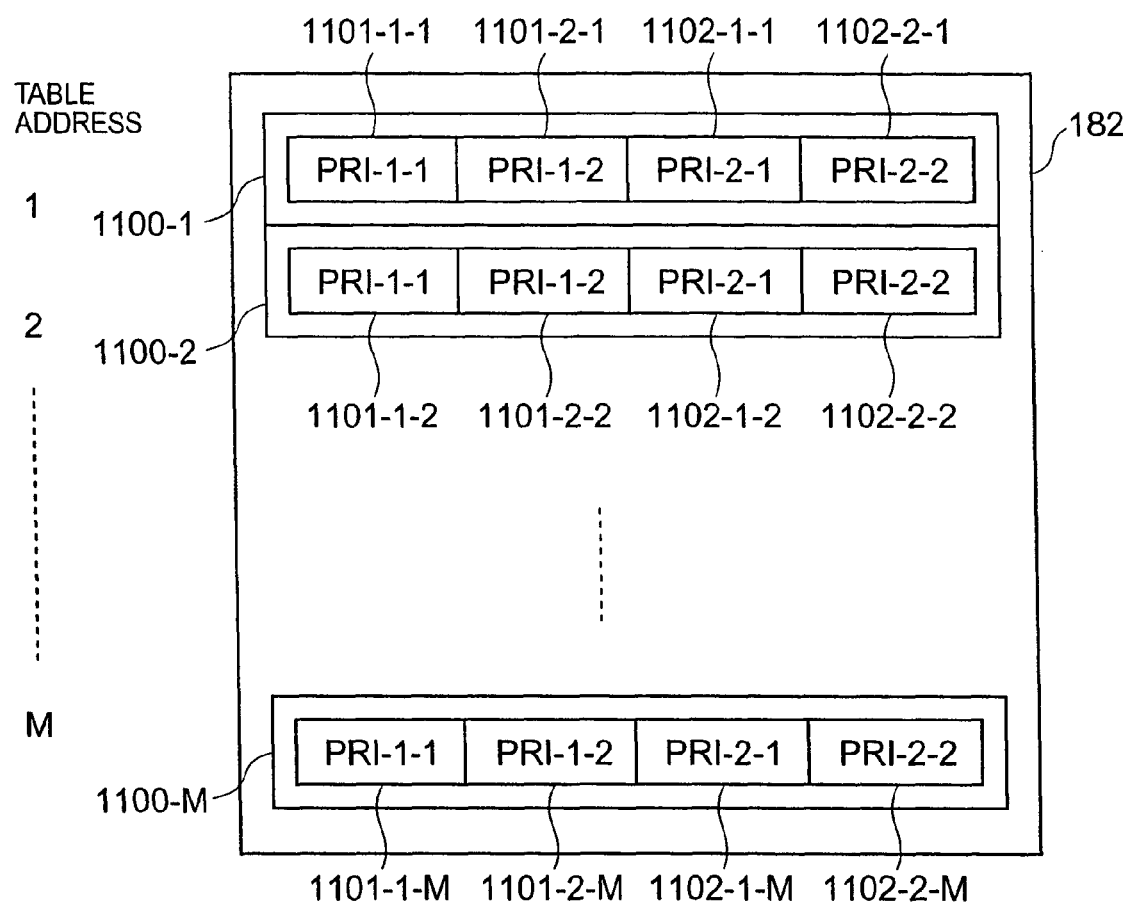
FIG. 11 is a diagram showing a format for a processing determination table 182.

FIG. 11 shows a format for the processing determination table 182. The processing determination table 182 accommodates processing information 1100-$i$ ($i$=1-M) corresponding to M flow detection conditions. The processing specifying information 1100-$i$ is comprised of, processing specifying information PRI-2-1 1102-1-$i$ ($i$=1-M) when the compliance/violation determination result is violation, and processing specifying information PRI-2-2 1102-1-$i$ ($i$=1-M) when the compliance/violation determination result is compliance, as processing information when a processing determination is made based on a plurality of monitoring policies having the same priority, in addition to processing specifying information PRI-1-1 1101-1-$i$ ($i$=1-M) when the compliance/violation determination result for an i-the monitoring policy is violation, and processing specifying information PRI-1-2 1101-2-$i$ ($i$=1-M) when the compliance/violation determination result for the i-the monitoring policy is compliance, as processing information for making a processing determination based on a single monitoring policy. In this embodiment, the value "0" is written when discard is specified.

Figure 16:
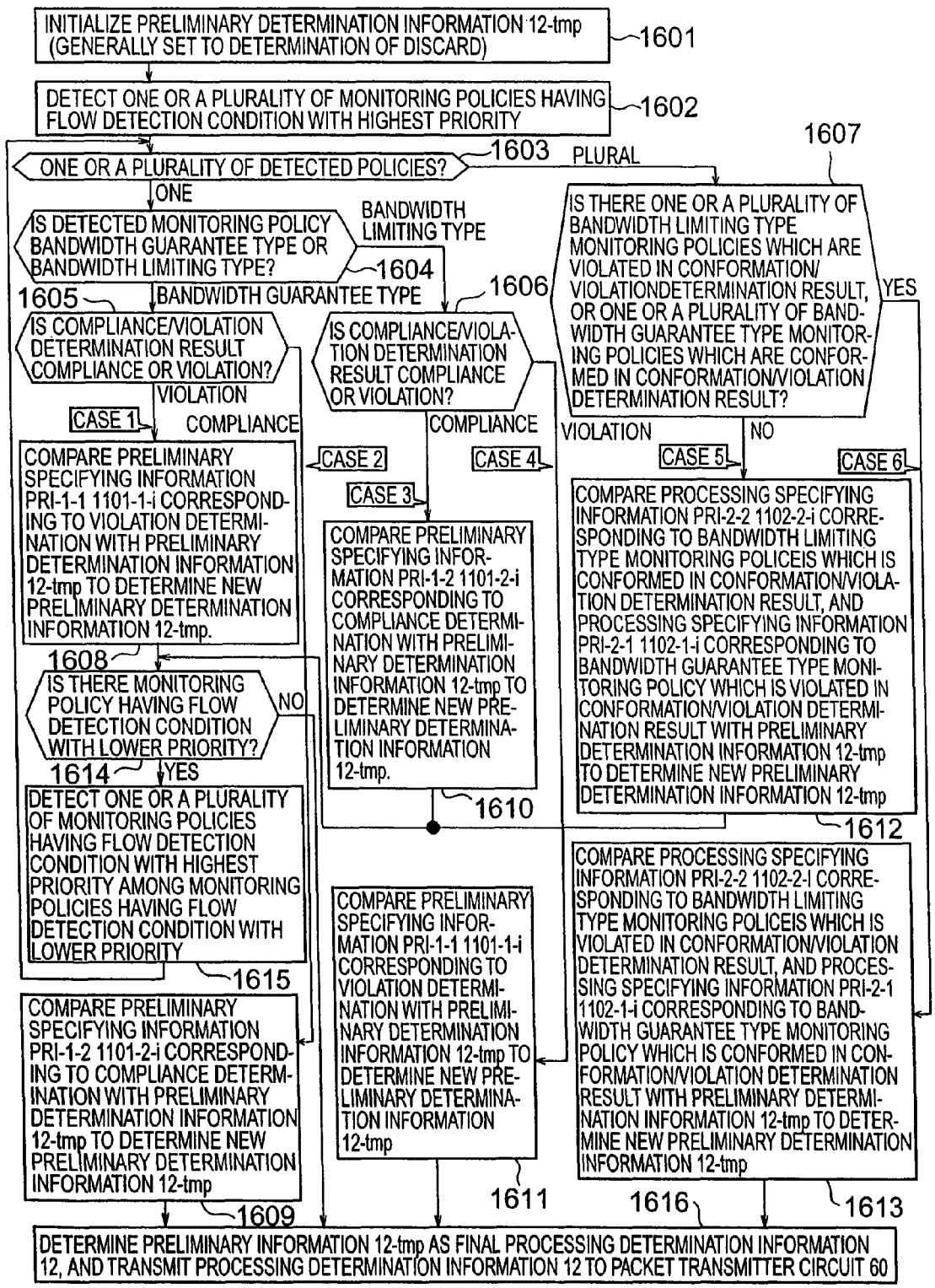
FIG. 16 is a flow chart illustrating a process for determining packet processing determination information 12.

Further, a packet processing determination is made based on all the compliance/violation determination results 193-$n$ ($n$=1-K) received from the total determination units 190-$n$ ($n$=1-K), all the processing specifying information 1100-$i$ corresponding to all the compliance/violation determination results 193-$n$ ($n$=1-K) read at step 1331, all the priority information FLOW-PRI-$n$ ($n$=1-K) received from all the priority storing means 191-$n$ ($n$=1-k), and monitoring policy type information FLOW-MAX-n, FLOW-MIN-n. In the packet processing determination, a determination for specifying discard of a packet, or a determination of a transfer priority for a packet is made preferentially using the processing specifying information 1100-$i$ corresponding to the compliance/violation determination result 193-$n$ associated with the monitoring policy having the flow detection condition which is given the highest priority FLOW-PRI-$n$, and the result of the determination is transmitted to the packet transmitter circuit 60 as the processing determination information 12 (step 1332). In the following, details on step 1332 will be described with reference to a flow chart of FIG. 16.

First, preliminary determination information 12-$tmp$ is provided as preliminary processing determination information 12 to initialize the preliminary determination information 12-$tmp$ (step 1601). Generally, the value of "0," which specifies discard, is set to an initial value of the preliminary determination information 12-$tmp$.

Next, one or a plurality of monitoring policies having a flow detection condition with the highest priority FLOW-PRI-$n$ are detected (step 1602), and different processing is performed depending on the number Z of detected monitoring policies (step 1603). When Z=1, it is determined based on the values of FLOW-MAX-n and FLOW-MIN-n whether the detected monitoring policy is a bandwidth guaranteeing type or bandwidth limiting type, such that different processing is performed depending on the type of the monitoring policy (step 1604). Further, different processing is performed in accordance with the compliance/violation determination result 193-$n$ (steps 1605/1606). On the other hand, when Z>1, different processing is performed, based on the values of FLOW-MAX-n and FLOW-MIN-n, when there is one or a plurality of bandwidth limiting policies which are determined as violated in the compliance/violation determination result or one or a plurality of bandwidth limiting monitoring policies which are determined as violated in the compliance/violation determination result, and when there is not any such monitoring policy (step 1607).

The following six cases result from the number of monitoring policies detected on the basis of the priority FLOW-PRI-$n$, the determination of the type of monitoring policies based on FLOW-MAX-n and FLOW-MIN-n, and the compliance/violation determination result 193-$n$, so that different packet processing determination is made on the respective cases:

Case 1: Z=1, FLOW-MIN-n=1, Compliance/Violation Determination Result 193-$n$=Compliance;

Case 2: Z=1, FLOW-MIN-n=1, Compliance/Violation Determination Result 193-$n$=Violation;

Case 3: Z=1, FLOW-MAX-n=1, Compliance/Violation Determination Result 193-$n$=Compliance;

Case 4: Z=1, FLOW-MAX-n=1, Compliance/Violation Determination Result 193-$n$=Violation;

Case 5: Z>1, and there is not any monitoring policy which satisfies FLOW-MAX-n=1 and Compliance/Violation Determination Result 193-$n$=Violation, or FLOW-MIN-n=1 and Compliance/Violation Determination Result 193-$n$=Compliance; or Case 6: Z>1, and there is one or a plurality of monitoring policies which satisfy FLOW-MAX-n=1 and Compliance/Violation Determination Result 193-$n$=Violation, or FLOW-MIN-n=1 and Compliance/Violation Determination Result 193-$n$=Compliance.

In Cases 1 and 4, the processing specifying information PRI-1-1 1101-1-$i$ corresponding to the violation determination result is compared with the preliminary determination information 12-$tmp$, and a priority specifying determination is determined as new preliminary determination information 12-$tmp$ if the comparison is made between a priority specifying determination and a discard determination, while a high priority specifying determination is determined as new preliminary determination information 12-$tmp$ when the comparison is made between a low priority specifying information and a high priority specifying information (steps 1608 and 1611).

In Cases 2 and 3, the processing specifying information PRI-1-2 1101-2-$i$ corresponding to a compliance determination result is compared with preliminary determination information 12-$tmp$ to determine new preliminary determination result 12-$tmp$ in a manner similar to Case 1 (steps 1609 and 1610).

In Case 6, for all of the bandwidth limiting monitoring policies determined as violated in the determination result, and the bandwidth guaranteeing monitoring policies determined as complied with in the determination result, the corresponding processing specifying information PRI-2-1 1102-1-$i$ or processing specifying information PRI-2-2 1102-2-$i$ is compared with the preliminary determination result 12-$tmp$, and a priority specifying determination is determined as new preliminary determination information 12-$tmp$ when the comparison is made between a priority specifying determination and a discard determination, while a high priority specifying determination is determined as new preliminary determination information 12-$tmp$ when the comparison is made between a low priority specifying determination and a high priority specifying determination (step 1613).

In Case 5, for all of the bandwidth limiting monitoring policies determined as complied with in the determination result, and the bandwidth guaranteeing monitoring policies determined as violated in the determination result, corresponding processing specifying information PRI-2-1 1102-1-$i$ or processing specifying information PRI-2-2 1102-2-$i$ is compared with the preliminary determination information 12-$tmp$ to determine the new preliminary information 12-$tmp$ in a manner similar to Case 6.

As described above, upon completion of the process for determining the preliminary determination information 12-$tmp$, different processing is performed in Cases 1, 3, 5 depending on whether or not there exist monitoring policies which have flow detection conditions with lower priorities FLOW-PRI-$n$ (step 1614). When existing, one or a plurality of monitoring policies having flow detection conditions with the highest priority FLOW-PRI-$n$ are detected from the monitoring policies having the flow detection conditions with lower priorities FLOW-PRI-$n$ (step 1615), and a similar process is executed again from step 1603. The preliminary determination information 12-$tmp$ is determined as the final processing determination information 12 when there exists no monitoring policies having flow detection conditions with lower priorities FLOW-PRI-$n$ in Cases 1, 3, 5, or in Cases 2, 4, 6, and the processing determination information 12 is transmitted to the packet transmitter circuit 60 (step 1616).

As described above, the values of [FLOW-PRI 909-$i$, FLOW-MAX 910-$i$, FLOW-MIN 911-$i$] corresponding to the monitoring policies A, B1, B2, C1, C2 are set to [1,1,0], [2,0,1], [2,0,1], [2,0,1], [2,0,1], respectively. Assume that the values of the processing specifying information [PRI-2-1 1102-1-$i$, PRI-2-2 1102-2-$i$, PRI-2-1 1102-1-$i$, PRI-2-2 1102-2-$i$] are set to [0,2,0,0], [0,0,0,4], [0,0,0,4], [0,0,0,2], [0,0,0,2], respectively. In this event, based on the magnitude of FLOW-PRI 909-$i$, the aforementioned sequence of processing at steps 1603-1615 is first performed for the monitoring policy B1 or B2 and the monitoring policy C1 or C2, and then the aforementioned sequence of processing at steps 1603-1615 is performed for the monitoring policy A.

First, the value of "0" for specifying discard is set as an initial value of the preliminary determination result 12-$tmp$. Next, from the fact that the priorities (=2) of the flow detection conditions of the monitoring policies B1, B2, C1, C2 are higher than the priority (=1) of the monitoring policy A and have the same value, the sequence of processing at steps 1603-1615 is performed by simultaneously using the compliance/violation determination result of the monitoring policy B1 or B2 and the compliance/violation determination result of the monitoring policy C1 or C2.

When the compliance/violation determination result 193-$n$ of the monitoring policy B1 or B2 is compliance, and when the compliance/violation determination result 193-$n$ of the monitoring policy C1 or C2 is violation (Case 6 in FIG. 16), the processing specifying information PRI-2-2 1102-2-$i$ upon determination of the monitoring policy B1 or B2 as complied with is compared with the preliminary determination information 12-$tmp$, and the final preliminary determination information 12-$tmp$ is determined to specify a high priority, thus terminating the sequence of processing at steps 1603-1615.

When the compliance/violation determination result 193-$n$ of the monitoring policy B1 or B2 is violation, and when the compliance/violation determination result 193-$n$ of the monitoring policy C1 or C2 is compliance (Case 6 in FIG. 16), the processing specifying information PRI-2-2 1102-2-$i$ upon determination of the monitoring policy C1 or C2 as complied with is compared with the preliminary determination information 12-$tmp$, and the final preliminary determination information 12-$tmp$ is determined to specify a middle priority, thus terminating the sequence of processing at steps 1603-1615.

When the compliance/violation determination result 1930$n$ of the monitoring policy B1 or B2 is compliance, and when the compliance/violation determination result 193-$n$ of the monitoring policy C1 or C2 is also compliance (Case 6 in FIG. 16), the processing specifying information PRI-2-2 1102-2-$i$ upon determination of the monitoring policy C1 or C2 as complied with is compared with the preliminary determination information 12-$tmp$, and the final preliminary determination information 12-$tmp$ is determined to specify a high priority, thus terminating the sequence of processing at steps 1603-1615.

When the compliance/violation determination result 1930$n$ of the monitoring policy B1 or B2 is violation, and when the compliance/violation determination result 193-$n$ of the monitoring policy C1 or C2 is also violation (Case 5 in FIG. 16), the processing specifying information PRI-2-1 1102-1-$i$ upon determination of the monitoring policy B1 or B2 as violated, and the processing specifying information PRI-2-1 1102-1-$i$ upon determination of the monitoring policy C1 or C2 as violated are compared with the preliminary determination information 12-$tmp$, and the final preliminary determination information 12-$tmp$ is determined to specify a discard. Subsequently, the sequence of processing at steps 1603-1615 is performed for the monitoring policy A.

When the compliance/violation determination result 193-$n$ of the monitoring policy A is violation, it is determined, in accordance with the value "0" of the processing specifying information PRI-1-1 1101-1-$i$ upon determination of the monitoring policy A as violated, to specify discard, and after a comparison with the preliminary determination information 12-$tmp$, the final preliminary determination information 12-$tmp$ is determined to specify a discard, thus terminating the sequence of processing at steps 1603-1615. When the compliance/violation determination result 193-$n$ is compliance, it is determined, based on the value "2" of the processing specifying information PRI-1-2 1101-2-$i$ upon determination of the monitoring policy A as complied with, to specify a middle priority, and after a comparison with the preliminary determination information 12-$tmp$, the preliminary determination information 12-$tmp$ is to specify a middle priority. Since there is no more monitoring policy to be determined, the sequence of processing at steps 1603-1615 is terminated.

Upon termination of the sequence of processing at steps 1603-1605 in the manner described above, the preliminary determination information 12-$tmp$ is determined to be final processing determination information 12 in the processing at step 1616, and the processing determination information 12 is transmitted to the packet transmitter circuit 60. Any information to specify a high priority, a middle priority, or discard is transmitted to the packet transmitter circuit 60.

Further, the bucket capacity THR-i (in bytes) 1001-$i$ ($i$=1-M) held in the traffic condition table 113, and POLR-i (in bytes/sec) 1002-$i$ (i=1-M), which is the rate of a leak from the bucket and indicates a bandwidth under monitoring, may be changed based on the resulting value of the processing determination information 12. For example, when discard is specified, the bandwidth under monitoring and bucket capacity are increased in the traffic condition for a matching one of the monitoring policies C1 and C2, while the bandwidth under monitoring and bucket capacity are reduced in the traffic condition for the other monitoring policy. When a middle priority is specified, the bandwidth under monitoring and bucket capacity are increased in the traffic condition for a matching one of the monitoring policies B1 and B2, while the bandwidth under monitoring and bucket capacity are reduced in the traffic condition for the other monitoring policy.

The foregoing strategy can be applied not only when flow detection conditions are in the unilaterally comprehensive relationship but also when flow detection conditions are in the mutually comprehensive relationship in the bandwidth monitoring performed based on a plurality of monitoring policies.

The managers of the intra-office networks 200, 201, 202 set information on the bandwidth monitoring to the respective nodes 1 using respective management terminals 2 external to the nodes 1 installed as the gateway nodes 210, 211, 212. A processor 30 in the node 1 records the contents described in commands in each table. As an example, FIG. 17 shows a command inputted to the management terminal 2 external to the node 1 installed as the gateway node 210. The intra-office networks 200, 201, 202 are represented by networks 192.168.200.0/24, 192.168.201/24, and 192.168.202.0/24, respectively, and the network 192.168.200.0/24 contains a sub-network 192.168.200.0.25 for transmitting key business data, and a sub-network 192.168.200.128/25 for transmitting general data.

The command shown in FIG. 17 is comprised of a flow detection condition 1702, a priority 1703-1 and a type 1703-2 of the flow detection condition, a traffic condition 1704 corresponding to the flow detection condition, and processing determination information 1705 for each flow number 1701.

The flow detection condition 1702 specifies FLOW-SIP 901-$i$ (i=1-M) indicative of a condition for the source IP address; FLOW-DIP 902-$i$ (i=1-M) indicative of a condition for the destination IP address; FLOW-SPORT 903-$i$ (i=1-M) indicative of a condition for the source port; FLOW-DPORT 904-$i$ (i=1-M) indicative of a condition for the destination port; FLOW-DSCP 905-$i$ (i=1-M) indicative of a condition for the transfer priority on the network layer; FLOW-SMAC 906-$i$ (i=1-M) indicative of a condition for the source MAC address; FLOW-DMAC 907-$i$ (i=1-M) indicative of a condition for the destination MAC address; FLOW-UPRI 908-$i$ (i=1-M) indicative of a condition for the Ether/MPLS priority which indicates the transfer priority on the data link layer; and FLOW-PROTO 912-$i$ (i=1-M) indicative of a condition for the protocol. In the example of FIG. 17, the flow detection conditions of the monitoring policies A, B1, B2, C1, C2 are described in the rows of the flow numbers 100, 1003, 1004, 1001, 1002, respectively.

The priority 1703-1 and type 1703-2 in the flow detection condition specify values for FLOW-PRI 909-$i$ (i=1-M) indicative of the priority of the flow detection condition; FLOW-MAX 910-$i$ (i=1-M) indicative of a monitoring policy for limiting to a certain bandwidth or less; and FLOW-MIN 911-$i$ (i=1-M) indicative of a monitoring policy for guaranteeing a certain bandwidth. In the example of FIG. 17, the priorities and types in the flow detection conditions for the monitoring policies A, B1, B2, C1, C2 are described in flow numbers 1000, 1003, 1004, 1001, 1002, respectively.

The traffic condition 1704 specifies the bucket capacity THR-i (in bytes) 1001-$i$ (i=1-M), and a value corresponding to POLR-i (in bytes/sec) 1002-$i$ which is the rate of a leak from the bucket, and indicates a bandwidth under monitoring.

The processing determination information 1705 specifies values corresponding to the processing specifying information PRI-2-1 1102-1-$i$ (i=1-M) when the compliance/violation determination result is violation, and the processing specifying information PRI-2-2 1102-2-$i$ (i=1-M) when the compliance/violation determination result is compliance, as processing information involved in the processing determination which is made based on a plurality of monitoring policies having the same priority, other than the processing specifying information PRI-1-1 1101-1-$i$ (i=1-M) when the compliance/violation determination result is violation, and the processing specifying information PRI-1-2 1101-2-$i$ (i=1-M) when it is compliance.

In the example of FIG. 17, the flow numbers 1000, 1003, 1004, 1001, 1002 correspond to the monitoring policies A, B1, B2, C1, C2, respectively.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A data transfer apparatus comprising:
   a transmitter/receiver unit for receiving an input packet;
   a storage unit for storing a first flow detection condition and a second flow detection condition, and a first traffic condition and a second traffic condition each indicative of an output limit bandwidth for a packet which matches each of the first flow detection condition and the second flow detection condition wherein the first flow detection condition and the second flow detection condition include at least one item corresponding to at least a part of information in a header of the input packet, and a first part of the first flow detection condition and a first part of the second flow detection condition are the same while a second part of the first flow detection condition completely does not include the second flow detection condition and a second part of the second flow detection condition completely does not include the first flow detection condition such that said first and second flow detection conditions are not in a unilaterally inclusion relation; and
   a processor for comparing the information in the header of the input packet received by said transmitter/receiver unit with the first flow detection condition and second flow detection condition, determining whether the input packet matches both of the first flow detection condition and the second flow detection condition or matches only one of the first flow detection condition and the second flow detection condition, and
   when it is determined that the input packet matches both of the first flow detection condition and the second flow detection condition, determining in parallel whether the input packet complies with or violates the first traffic condition corresponding to the first flow detection condition and the second traffic condition corresponding to the second flow detection condition and determining processing for the input packet based on a result of the parallel determinations as to whether the input packet complies with or violates the first traffic condition and the second traffic condition, and when it is determined that the input packet matches only one of the first flow detection condition and the second flow detection condition, determining whether the input packet complies with or violates a traffic condition corresponding to the only one of the first flow detection condition and the second flow detection condition which the input packet matches and determining processing for the input packet based on a result of the determination as to whether the input packet complies with or violates the traffic condition corresponding to the flow detection condition which the input packet matches.

2. A data transfer apparatus according to claim 1, wherein:
said storage unit stores a plurality of flow detection conditions and a plurality of traffic conditions corresponding to the plurality of flow conditions, respectively, and
said processor determines whether or not a packet complies with or violates at least one of the traffic conditions corresponding to at least one of the flow detection conditions which matches the information in the header of the input packet received by said transmitter/receiver unit among the plurality of flow detection conditions, and determines processing for the input packet based on the result of the determination.

3. A data transfer apparatus according to claim 1, further comprising a storage unit for storing a table which contains processing for the input packets respectively corresponding to:
   a case where the input packet is determined to comply with the first traffic condition and to comply with the second traffic condition;
   a case where the input packet is determined to comply with the first traffic condition and to violate the second traffic condition;
   a case where the input packet is determined to violate the first traffic condition and to comply with the second traffic condition; and
   a case where the input packet is determined to violate the first traffic condition and to violate the second traffic condition.

4. A data transfer apparatus according to claim 3, further comprising a storage unit for storing a table which contains processing for the input packets respectively corresponding to:
   a case where the input packet matches the first flow detection condition, but does not match the second flow detection condition, and is determined to comply with the first traffic condition;
   a case where the input packet matches the first flow detection condition, but does not match the second flow detection condition, and is determined to violate the first traffic condition;
   a case where the input packet does not match the first flow detection condition, but matches the second flow detection condition, and is determined to comply with the second traffic condition; and
   a case where the input packet does not match the first flow detection condition, but matches the second flow detection condition, and is determined to violate the second traffic condition.

5. A data transfer apparatus according to claim 1, wherein:
said storage unit stores a third flow detection condition and a third traffic condition which corresponds to the third flow detection condition wherein the third flow detection condition includes at least one item corresponding to at least a part of the information in the header of the input packet, and a part of the first flow detection condition, a part of the second flow detection condition, and a part of the third flow detection condition are the same, and
said processor determines processing for the input packet which matches the first flow detection condition or the second flow detection condition based on both of the result of the parallel determination as to the compliance/violation of the first traffic condition or the second traffic condition and a result of the determination as to the compliance/violation of the third traffic condition, and determines processing for the input packet which does not match the first or second flow detection condition but matches the third flow detection condition based only on the result of the determination as to the compliance/violation of the third traffic condition.

6. A data transfer apparatus according to claim 1, wherein:
said storage unit stores the flow detection condition and the traffic condition corresponding to the traffic condition in combination as a bandwidth monitoring policy.

7. A data transfer apparatus according to claim 1, wherein:
said traffic condition includes information indicative of an allowable bandwidth, an allowable burst, and a packet arrival log.

8. A data transfer apparatus according to claim 1, wherein:
said processor stores a lower priority for transmission in the header of an input packet which violates the traffic condition than a priority for transmission stored in the header of an input packet which complies with the traffic condition.

9. A data transfer apparatus according to claim 1, wherein:
said processor discards an input packet which is determined to violate all the traffic conditions.

10. A data transfer apparatus according to claim 1, wherein:
said processor changes the traffic condition based on the result of the determination on the compliance/violation of the traffic condition.

* * * * *

UNITED STATES PATENT AND TRADEMARK OFFICE
CERTIFICATE OF CORRECTION

| | | |
|---|---|---|
| PATENT NO. | : 8,451,722 B2 | Page 1 of 1 |
| APPLICATION NO. | : 11/212678 | |
| DATED | : May 28, 2013 | |
| INVENTOR(S) | : Isobe et al. | |

It is certified that error appears in the above-identified patent and that said Letters Patent is hereby corrected as shown below:

On the title page, in Item (73) please delete:

"Alaxa Networks Corporation, Kanagawa, (JP)"

and insert:

--Alaxala Networks Corporation, Kanagawa, (JP)--

Signed and Sealed this
Twenty-third Day of September, 2014

Michelle K. Lee
*Deputy Director of the United States Patent and Trademark Office*